US011975959B2

(12) United States Patent
McGovern et al.

(10) Patent No.: US 11,975,959 B2
(45) Date of Patent: May 7, 2024

(54) UNIT FOR DISPENSING ULTRA-HIGH GRAVITY FERMENTED BEVERAGES ON DRAFT

(71) Applicant: Alfa Laval Copenhagen A/S, Soborg (DK)

(72) Inventors: Ronan McGovern, Soborg (DK); John Cataldo, Soborg (DK); Natalie Ciaccia, Soborg (DK); Adam Weiner, Soborg (DK); Ricky Ma, Soborg (DK)

(73) Assignee: ALFA LAVAL COPENHAGEN A/S, Soborg (DK)

( * ) Notice: Subject to any disclaimer, the term of this patent is extended or adjusted under 35 U.S.C. 154(b) by 0 days.

(21) Appl. No.: 17/797,773

(22) PCT Filed: Feb. 5, 2021

(86) PCT No.: PCT/US2021/016897
§ 371 (c)(1),
(2) Date: Aug. 5, 2022

(87) PCT Pub. No.: WO2021/158975
PCT Pub. Date: Aug. 12, 2021

(65) Prior Publication Data

US 2023/0057813 A1 Feb. 23, 2023

Related U.S. Application Data

(60) Provisional application No. 62/971,447, filed on Feb. 7, 2020.

(51) Int. Cl.
*B67D 1/00* (2006.01)
*B67D 1/08* (2006.01)
(Continued)

(52) U.S. Cl.
CPC ......... *B67D 1/0021* (2013.01); *B67D 1/0888* (2013.01); *B67D 1/122* (2013.01);
(Continued)

(58) Field of Classification Search
CPC .... B67D 1/0021; B67D 1/0888; B67D 1/122; B67D 2001/0097; B67D 2001/0487; B67D 2001/0095; B67D 1/0043
See application file for complete search history.

(56) References Cited

U.S. PATENT DOCUMENTS 4,544,084 A * 10/1985 Cleland ................ B67D 1/1279 222/64
9,499,390 B1 * 11/2016 Newton ............... B67D 1/0014
(Continued)

FOREIGN PATENT DOCUMENTS

EP 2 889 264 A1 7/2015
EP 2 566 777 B1 11/2016
(Continued)

OTHER PUBLICATIONS

International Preliminary Report on Patentability, issued in PCT/US2021/016897, dated Jan. 26, 2022.
(Continued)

*Primary Examiner* — Donnell A Long
(74) *Attorney, Agent, or Firm* — Birch, Stewart, Kolasch & Birch, LLP

(57) ABSTRACT

A beverage system that produces a fermented beverage from two or more liquid streams, includes a first source including an ultra-high gravity beverage at a pressure of 82.7 kPa to 1034.2 kPa; a second source including a carbonated and/or nitrogenated water at a pressure of 82.7 kPa to 1034.2 kPa and and a temperature of 0° to 8°; a mixing point that allows mixing of the ultra high gravity beverage to blend with the carbonated and/or nitrogenated water to produce a fer-
(Continued)

mented beverage; and a fluid line fluidly coupled to the mixing point and configured to allow the fermented beverage to flow to a dispensing tap. The fluid line has a length of 0.3048 m to 45.72 m and an inner diameter of 3.2 mm to 15.9 mm for at least a portion of the line.

20 Claims, 13 Drawing Sheets

(51) Int. Cl.
*B67D 1/12* (2006.01)
*B67D 1/04* (2006.01)

(52) U.S. Cl.
CPC ................ *B67D 2001/0097* (2013.01); *B67D 2001/0487* (2013.01)

(56) References Cited

U.S. PATENT DOCUMENTS

| | | | | |
|---|---|---|---|---|
| 2015/0321893 | A1* | 11/2015 | Corbelli | G01F 11/125 222/1 |
| 2016/0222332 | A1 | 8/2016 | Peirsman et al. | |
| 2019/0161335 | A1* | 5/2019 | Neven | B67D 1/06 |
| 2019/0291062 | A1* | 9/2019 | Wood | A47J 31/4492 |
| 2019/0322518 | A1 | 10/2019 | Bond | |
| 2020/0325428 | A1* | 10/2020 | Durkee | C12C 13/10 |

FOREIGN PATENT DOCUMENTS

| | | | | | |
|---|---|---|---|---|---|
| EP | 3 178 782 | A1 | | 6/2017 | |
| EP | 3 330 215 | A1 | | 6/2018 | |
| GB | 2274642 | A | * | 8/1994 | B67D 1/1218 |
| WO | WO 2014/014690 | A1 | | 1/2014 | |
| WO | WO 2018/002703 | A1 | | 1/2018 | |
| WO | WO 2018/104810 | A1 | | 6/2018 | |

OTHER PUBLICATIONS

International Search Report, issued in PCT/US2021/016897, dated Jun. 8, 2021.
Written Opinion of the International Searching Authority, issued in PCT/US2021/016897, dated Jun. 8, 2021.
European Communication pursuant to Article 94(3) EPC dated Aug. 25, 2023 for Application No. 21 708 879.8.

* cited by examiner

Fig. 1 Prior Art – post-mix dispensing system

Fig. 2 Prior Art – beer tap system

1301

UNIT FOR DISPENSING ULTRA-HIGH GRAVITY FERMENTED BEVERAGES ON DRAFT

CROSS REFERENCE TO RELATED APPLICATIONS

This application is the National Phase of PCT International Application No. PCT/US2021/016897, filed on Feb. 5, 2021, which claims priority under 35 U.S.C. 119(e) to U.S. Provisional Application No. 62/971,447, filed on Feb. 7, 2020, all of which are hereby expressly incorporated by reference into the present application.

TECHNICAL FIELD

The present invention relates to a system and method for dispensing ultra-high gravity fermented beverages on draft.

BACKGROUND ART

One common form of dispensing system is a post-mix soda dispensing system, such as shown in FIG. 1, which carbonates and cools water, and then mixes it with syrup (often pumped from a bag in box) in a nozzle of a soda gun.

Another form of dispensing system is a beer tap system, such as shown in FIG. 2, which includes a pressurized beer keg, connected via tubing, to a dispensing tap that may be opened or closed, e.g., at the bar by pulling on a handle. In such scenarios, it is common for the keg to be stored in a cold location (such as a cellar)—which is important for maintaining carbonation and/or nitrogenation—and for long fluid lines to connect the keg in the cellar to the dispensing tap. For a desirable pour (in terms of foaming), it is common to dispense at approximately 2 oz/s (59.1 ml/s, 1 oz being 29.57 ml, also depicted as mL) from kegs under pressure in the range of 12-15 psig (82.7-103.4 kPa, 1 psig being about 6.89 kPa), as documented by the Brewers Association (see, e.g., Draught Beer Quality Manual, Third Edition. Brewers Association. 2017). Typically, tubing used in draft installations has inner diameters ranging from 3⁄16" to ½" (4.8 mm to 12.7 mm, 1" (inch) being 25.4 mm or 2.54 cm) and corresponding tube lengths to provide sufficient resistance to prevent breakout of carbonation and/or nitrogenation. Pressurized kegs exist in two formats: reusable metal containers and disposable plastic containers. Reusable metal containers consist of a single container volume that contains both liquid and gas, the gas being used to dispense the liquid out through a bottom tube via applied pressure. Disposable plastic containers, such as those sold as Keykegs by Lightweight Containers B.V. and detailed in European Patent EP2566777B1, have a flexible unit for containing liquids situated within an inflexible outer unit suitable for holding gas pressure. In this system, liquid can be dispensed via gas pressure without contact between gas and the liquid.

An example of a beverage dispensing system having a beverage font for dispensing alcoholic beverages via mixed streams is described in European Patent EP3178782A1 which details a dispensing unit with an electronically controlled valve for combining a feed stream with multiple optional streams for the creation of multiple beverage options.

SUMMARY

According to the present disclosure, a beverage system that produces a fermented beverage from two or more liquid streams includes a first source comprising ultra-high gravity beverage at a pressure of about 12 psig to about 150 psig (82.7 to 1034.2 kPa), a second source comprising a carbonated and/or nitrogenated water at a pressure of about 12 psig to about 150 psig (82.7 to 1034.2 kPa) and a temperature of about 0 to about 8° C., a first fluid line fluidly coupled to the first source and configured to allow the ultra-high gravity beverage to flow from the first source through the first fluid line, a second fluid line fluidly coupled to the second source and configured to allow the carbonated and/or nitrogenated water to flow from the second source through the second fluid line, a mixing point that fluidly couples the first fluid line to the second fluid line, the mixing point configured to allow the ultra-high gravity beverage to blend with the carbonated and/or nitrogenated water at the mixing point to produce the fermented beverage, a first one-way valve along the first fluid line between the first source and the mixing point, a second one-way valve along the second fluid line between the second source and the mixing point, and a third fluid line fluidly coupled to the mixing point and configured to allow the fermented beverage to flow to a dispensing tap, wherein the third fluid line has a length of about 1 foot to about 150 feet (0.30 m to 45.7 m, 1 foot being 0.3048 m) and an inner diameter of about ⅛$^{th}$ of an inch to about ⅝$^{th}$ of an inch (3.2 mm to 15.9 mm) for at least a portion of the third fluid line.

In related embodiments, the fermented beverage may include beer, wine and/or hard cider and the ultra-high gravity beverage may respectively include ultra-high gravity beer, ultra-high gravity wine, and/or ultra-high gravity hard-cider. The first source, the second source and/or the third source may be at a pressure of about 12 psig (82.7 kPa) to about 60 psig (413.7 kPa). The pressure of the second source may be about 25 psig (172.4 kPa) to about 40 psig (275.8 kPa). The third fluid line may have a length of about 1 foot (0.30 m) to about 50 feet (15.2 m). The second fluid line and/or the third fluid line may include a pump. The length and the inner diameter of the third fluid line may be configured to provide for a flow rate of the fermented beverage at the dispensing tap of between about 0.5 to about 3 fluid ounces (14.8 to 88.7 mL) per second, preferably about 1.7 to about 2.3 fluid ounces (50.3 to 68 mL) per second. The second source may include a water supply, a carbonator and/or nitrogenator, and a water pressure regulator between the water supply and the carbonator and/or nitrogenator, and the water pressure regulator may be configured to regulate pressure of water from the water supply to the carbonator and/or nitrogenator to be about 10 psig (68.9 kPa) to about 30 psig (206.8 kPa). The second source may include a water supply, a carbonator and/or nitrogenator, and/or a pump. The system may further include a fixed or variable flow restrictor coupled to the first fluid line and configured to achieve an alcohol concentration of between about 3% to about 7% alcohol by volume and/or a real extract concentration of between about 1.5% to about 5% real extract by weight in the fermented beverage. The first source may be at a temperature of between about 0° C. to about 8° C. The first source may be held within a container, and the container may be (a) a pressurized keg or (b) a keg or bag in box at about ambient pressure and coupled to a pump configured to draw the ultra-high gravity beverage from the keg or the bag in box to the first one-way valve. For example, the keg may be a bag-in-ball keg. The pump may be (a) a positive displacement pump configured to receive a signal from a pressure switch or a pressure transducer and/or (b) a gas driven pump. The container may be insulated and cooled. The container may be insulated with an insulating material. The insulating material may include an open-cell foam, a closed-cell foam, and combinations thereof. The insulating material may include neoprene, a closed-cell polystyrene foam, and combinations thereof. The container may be insulated with an insulating material which has a thickness of between about 0.5 cm to about 3 cm. The container may be coupled via a transfer valve to a second container holding the ultra-high gravity beverage. The temperature of the carbonated and/or nitrogenated water may be achieved by (a) a cooling coil submersed in an ice bath, the cooling coil being coupled to a carbonator and/or nitrogenator, and/or (b) a heat exchanger, the heat exchanger being coupled to a carbonator and/or nitrogenator. The ice bath or the heat exchanger may be configured to provide cooling for (a) the carbonated and/or nitrogenated water, (b) the third fluid line, and/or (c) the carbonator and/or nitrogenator. Preferably, the ice bath or the heat exchanger is configured to provide cooling for the third fluid line. The cooling of the third fluid line is achieved via a cooling coil in the ice bath. The heat exchanger may be a plate heat exchanger and/or a tube heat exchanger. The beverage system may further include a treatment system coupled to the second fluid line, and the treatment system may be reverse osmosis, carbon filtration, UV treatment, ion exchange treatment and/or microfiltration. The ultra-high gravity beverage may be between about 15% to about 40% alcohol by volume. The beverage system may further include a trap coupled to the first fluid line and/or the second fluid line and configured to collect sediment within the carbonated and/or nitrogenated water and/or the ultra-high gravity beverage. The system may further include a sensor located between the mixing point and the dispensing tap or located within the dispensing tap and configured to measure alcohol concentration within the fermented beverage. The sensor may be a refractometer, a density meter, and/or a sound velocity meter. The third fluid line may have a length of about 3 feet (0.9 m) to about 30 feet (9.1 m). The carbonation and/or nitrogenation of the water may be between about 1 to about 5 volume of gas per volumes of liquid, preferably between about 2 to about 3.5 volume of gas per volumes of liquid. The second source may further include a compressed gas supply and a gas pressure regulator between the compressed gas supply and the carbonator and/or nitrogenator, and the gas pressure regulator may be configured to regulate pressure of gas to the carbonator and/or nitrogenator to be about 25 psig (172.4 kPa) to about 40 psig (275.8 kPa). The ultra-high gravity beverage may be held within a pressurized container, and the gas pressure regulator may be between the compressed gas supply and the pressurized container and further configured to regulate the pressure of the gas to the pressurized container. The second source may include a water supply, a carbonator and/or nitrogenator, and a pump, wherein the carbonator and/or nitrogenator is between the water supply and the pump. The first one-way valve and/or the second one-way valve may be located about 0 to about 5 inches (12.7 cm) from the mixing point. The system may produce two or more fermented beverages. When producing a second fermented beverage, the system may further include a third source that includes a second ultra-high gravity beverage at a pressure of about 12 psig (82.7 kPa) to about 150 psig (103.4 kPa), a fourth fluid line fluidly coupled to the third source and configured to allow the second ultra-high gravity beverage to flow from the third source through the fourth fluid line, and a second mixing point that fluidly couples the second fluid line to the fourth fluid line. The second mixing point is configured to allow the second ultra-high gravity beverage to blend with the carbonated and/or nitrogenated water at the second mixing point to produce the second fermented beverage. The system further includes a third one-way valve along the fourth fluid line between the third source and the second mixing point, a fourth one-way valve along the second fluid line between the second source and the second mixing point, and a fifth fluid line fluidly coupled to the second mixing point and configured to allow the second fermented beverage to flow to a second dispensing tap. The fifth fluid line has a length of about 1 foot (0.3 m) to about 150 feet (45.7 m) and an inner diameter of about $\frac{1}{8}^{th}$ of an inch (3.2 mm) to about $\frac{5}{8}^{th}$ of an inch (15.9 mm) for at least a portion of the fifth fluid line. The third source may include the second ultra-high gravity beverage. The fifth fluid line may have a length of about 1 foot (0.3 m) to about 50 feet (15.2 m).

In related embodiments, the beverage system may further include a controller configured to provide one or more parameters to the beverage system in order to produce the fermented beverage, a controller configured to record one or more parameters from the beverage system, and/or a controller configured to provide a secure access to the beverage system. The one or more parameters may include parameters for an input voltage to a positive displacement pump, a pressure transducer, a flow meter, a refractive index sensor, a density sensor, a sonic sensor, a near infra-red sensor, and/or an ethanol sensor. The controller configured to provide a secure access to the beverage system may provide secure access to a pump that is configured to draw the ultra-high gravity beverage through the first fluid line and/or may be held within a secure enclosure. The one or more parameters provided to the beverage system and/or the one or more parameters recorded from the beverage system may be remotely accessed via a wifi or cellular connection. The flow meter may measure flow of water, carbonated water and/or nitrogenated water and provide an output signal to the controller, and the controller may provide an output signal to the positive displacement pump in order to cause an alcohol concentration and/or a real extract concentration of the fermented beverage to be maintained approximately constant.

Carbonation/Nitrogenation and Dispensing of Carbonated/Nitrogenated Beverages

Embodiments of the present invention allow a fermented beverage to be poured at a similar flow rate and with similar properties, e.g., foaming characteristics, as is the case with a keg on draft or box, but when using an ultra-high gravity beverages (uHGB) blended with carbonated and/or nitrogenated water. Post-mix systems of the type shown in FIG. 1, that are typically used for sodas, are not acceptable for fermented beverages, e.g., cause the blend of ultra-high gravity beer and carbonated and/or nitrogenated water to foam excessively due to the pressure rapidly dropping to atmospheric at the point of dispensing when the tap is opened. Embodiments of the present invention include a length of fluid line between the dispensing tap and the mixing point of the uHGB and the carbonated and/or nitrogenated water, which was found to be crucial in achieving a smooth pour, e.g., without excessive foaming. For example, at fluid line lengths of 5 (1.5 m) and 10 feet (15.2 m), significant foaming was still observed, even when chilling the carbonated and/or nitrogenated water down to close to zero Celsius. However, an acceptable dispensing system is formed when the pressure at the blend point is controlled to ensure that the pressure is not too low. Low pressure at the mixing point causes the gas to escape in solution. Thus, embodiments of the present invention keep the pressure at the blend point sufficiently high to keep gas in solution, and then have a fluid line length long enough to slowly and smoothly lower the pressure of the mixture as the fluid approaches the dispensing tap. In other words, embodiments of the present invention disclose a hybrid system between a post-mix system and a beer tap system where a significant length of fluid line exists between the mixing point and the point of dispensing in order to a) maintain the pressure of the mixing point between about 10 psig (6.9 kPa) and about 40 psig (275.8 kPa) (e.g., ideally around 25-35 psig (172-241 kPa)), and b) smoothly allow the pressure to tail down towards ambient pressure at the mouth of the dispensing tap. For a further reduction in foaming, the fluid line after the mixing point may be further cooled, for example, by passing the fluid through a coiling coil in an ice bath. For example, for a 2 oz/s (59.1 mL/s) pour, about 20-50 ft (6-15.2 m) of 3⁄16" (4.8 mm) fluid line yields an acceptable pour. For a slower pour of 1 oz/s (29.6 mL/s), a 20-50 ft (6-15.2 m) length of 1⁄8" (1.6 mm) fluid line yields an acceptable pour. Pours at shorter line lengths are also possible depending on the carbonated and/or nitrogenated water inlet conditions. Furthermore, when the dispensing tap is closed, the pressure in all fluid lines should reach the inlet pressure of the water. If this inlet pressure of the water is too high, then gas breaks out of the fluid once the dispensing tap is opened and a normal pour will not be restored until the fluid lines are filled with fresh beer. Preferably, there is a pressure regulator on the inlet water line to the system that keeps the pressure at about 25 (172.4 kPa) to 40 psig (275.8 kPa).

In accordance with an embodiment of the invention, where the feed streams do not contain carbonation and/or nitrogenation and where carbonation and/or nitrogenation is desired in the dispensed beverage, carbon dioxide and/or nitrogen gas is supplied through addition to one of the feed streams. The gas may be supplied under pressure in the range of 30 to 150 psig (206.8 to 1034.2 kPa), and more preferably from 40 to 60 psig (275.8 to 413.7 kPa), to a chamber in which one of the feed streams is fed via a pump. The pressure of the stream to be carbonated and/or nitrogenated may be 15 to 100 psig (103.4 to 689.5 kPa), or more preferably 30 to 40 psig (206.8 to 275.8 kPa), and lower than the pressure of gas supplied. Furthermore, the stream to be carbonated and/or nitrogenated flows fast enough to prevent cavitation of the pump, which is achieved through the use of tubing that is about 3⁄4" to 1⁄2" (6.4 mm to 12.7 mm) at its inner diameter. The gas entrainment and dissolution system may be similar to that disclosed in U.S. Pat. No. 3,397,870, which entails a feed stream fed through a spray nozzle into the gas chamber and a pump control system to liquid feed to the chamber when the liquid level in the chamber drops below a pre-specified level.

In accordance with an embodiment of the invention, the dispensing tap may be operated manually and have substantially the same operation as a dispensing tap in a conventional draft installation. To preserve the quality of the beverage between pours (by minimizing rapid gas break-out when the tap is opened and pressure drops), a pressure regulator may maintain the pressure of the water stream ahead of the carbonator and/or nitrogenator to between about 25-40 psig (172.4-275.8 kPa).

In a related embodiment, to prevent breakout of carbonation and/or nitrogenation in the beverage before the beverage is dispensed, the pressure of the two or more feed streams may be between about 12 (82.7 kPa) and 40 psig (275.8 kPa) at the blending point, and more preferably, between about 25 (172.4 kPa) and 35 psig (241.3 kPa). Additionally, the length of tubing between the blend point and the dispensing tap is about 1 to 150 feet (0.3 to 45.7 m) in length, or more preferably between 3 (0.91 m) and 30 feet (9.1 m). The tubing used for conveying the liquid streams from feed sources and from the carbonator and/or nitrogenator to the dispensing tap are between about 3⁄16" (4.8 mm) and 1⁄4" (6.35 mm) in inner diameter. In a preferred embodiment, the stream containing alcohol in the range of 15-30% alcohol by volume may have a trap filter on its outlet to collect any sediment that may be present.

In a further related embodiment, the stream to be carbonated and/or nitrogenated may be cooled to between the freezing point of the liquid and about 6 degrees Celsius, and more preferably, between about 0.5 degrees Celsius and about 2 degrees Celsius.

In yet a further related embodiment, insulation and a cooling method may be applied to the system, thus maintaining target temperatures for higher degrees of carbon dioxide and/or nitrogen dissolution. The insulation may include an outer layer of material with low thermal conductivity, such as neoprene and/or a closed-cell polystyrene foam. The cooling method may include a flowing heat transfer fluid, such as glycol, in conjunction with a chilling unit or a static heat transfer fluid, such as an ice bath, surrounding an inner portion of tubing in contact with fluid tubes and surfaces that contains a heat transfer fluid such as glycol flowing from a chilling unit. The insulation surrounding the tubing between the blending point of the multiple liquid feeds and dispensing tap may be similar to a cooling trunk, sometimes called a glycol trunk, commonly used in draft beer installations.

In a related embodiment, the container of uHGB may be maintained at a cool temperature of 2 degrees Celsius to 7 degrees Celsius, and more preferably between 3 degrees Celsius to 4 degrees Celsius, which may be achieved by the use of a cool room or by a container jacket containing a flowing or static heat transfer fluid. The flowing heat transfer fluid may be glycol from a chiller unit, water from an ice bath, or water from the feed stream to be carbonated and/or nitrogenated, thus taking advantage of an existing chilled stream. This insulation or jacketing or cooling can favorably extend the shelf life of the beer. Embodiments may use a bag in ball type keg, which allows liquid to be pushed by gas, and avoids the need for a small pump to move liquid to the blend point, although, in certain embodiments (such as those using a bag in box), a small pump may be employed. Furthermore, the use of a bag in ball type keg (as opposed to a standard keg) can improve the process as there is no direct contact between gases and the key keg's contents. For example, when compressed air is used to deliver uHGB, the system prevents potential oxidation that can reduce shelf life. When carbon dioxide and/or nitrogen is used to deliver uHGB, the system prevents the dissolution of carbon dioxide and/or nitrogen into the uHGB that can affect the level of carbonation and/or nitrogenation in the final delivered beverage.

In a related embodiment, the quality of the beverage may be monitored for alcohol content and real extract content using an in-line sensor installed between the blend point and the dispensing tap or using a sensor built into the dispensing tap. The sensor may include a refractometer, density meter, sound velocity sensor and/or near infrared sensor. Optionally there may be an electronic display showing the percentage alcohol of the pour, to provide assurance to consumers and/or regulatory agencies.

In accordance with one embodiment of the invention, a beverage system that produces a fermented beverage from two or more liquid streams includes a first source comprising ultra-high gravity beverage at a pressure of about 0 psig (0 kPa) to about 150 psig (1034.2 kPa), a second source comprising a carbonated and/or nitrogenated water at a pressure of about 12 psig (82.3 kPa) to about 150 psig (1034.2 kPa) and a temperature of about 0 to about 8° C., a first fluid line fluidly coupled to the first source and configured to allow the ultra-high gravity beverage to flow from the first source through the first fluid line, a second fluid line fluidly coupled to the second source and configured to allow the carbonated and/or nitrogenated water to flow from the second source through the second fluid line, a mixing point that fluidly couples the first fluid line to the second fluid line, the mixing point configured to allow the ultra-high gravity beverage to blend with the carbonated and/or nitrogenated water at the mixing point to produce the fermented beverage, a third fluid line fluidly coupled to the mixing point and configured to allow the fermented beverage to flow to a dispensing tap, a controller configured to provide one or more parameters to the beverage system in order to produce the fermented beverage, and a valve located within the dispensing tap or between the mixing point and the dispensing tap within twelve inches from the dispensing tap, the valve configured to be actuated by an electronic signal provided to the valve from the controller.

The beverage system may further include a digital screen, configured to receive a signal from the controller, and configured to display measured or derived parameters associated with the fermented beverage and/or the beverage system. The measured or derived parameters may include carbon dioxide content, nitrogen content, temperature, calories, alcohol by volume, pour flow rate, remaining dispensable volume, and combinations thereof. The controller may provide an electronic signal when the carbon dioxide content, nitrogen content, alcohol by volume, temperature, and/or pour flow rate deviates by more than 5% from a target value for any one of the aforementioned parameters.

In accordance with one embodiment of the invention, a beverage system that produces a fermented beverage from two or more liquid streams includes a first source comprising ultra-high gravity beverage at a pressure of about 0 psig (0 kPa) to about 150 psig (1034.2 kPa), a second source comprising a carbonated and/or nitrogenated water at a pressure of about 12 psig (82.7 kPa) to about 150 psig (1034.2 kPa) and a temperature of about 0 to about 8° C., a first fluid line fluidly coupled to the first source and configured to allow the ultra-high gravity beverage to flow from the first source through the first fluid line, a second fluid line fluidly coupled to the second source and configured to allow the carbonated and/or nitrogenated water to flow from the second source through the second fluid line, a mixing point that fluidly couples the first fluid line to the second fluid line, the mixing point configured to allow the ultra-high gravity beverage to blend with the carbonated and/or nitrogenated water at the mixing point to produce the fermented beverage, a third fluid line fluidly coupled to the mixing point and configured to allow the fermented beverage to flow to a dispensing tap, a controller configured to provide one or more parameters to the beverage system in order to produce the fermented beverage, and a digital screen, configured to receive a signal from the controller, and a digital screen configured to display measured or derived parameters associated with the fermented beverage and/or the beverage system. The displayed parameters (measured or derived) may include carbon dioxide content, nitrogen content, temperature, calories, pour flow rate, alcohol by volume, remaining dispensable volume, and combinations thereof.

In accordance with one embodiment of the invention, a beverage system that produces a fermented beverage from two or more liquid streams includes a first source comprising ultra-high gravity beverage at a pressure of about 0 psig (0 kPa) to about 150 psig (1034.2 kPa), a second source comprising a carbonated and/or nitrogenated water at a pressure of about 12 psig (82.7 kPa) to about 150 psig (1034.2 kPa) and a temperature of about 0 to about 8° C., a first fluid line fluidly coupled to the first source and configured to allow the ultra-high gravity beverage to flow from the first source through the first fluid line, a second fluid line fluidly coupled to the second source and configured to allow the carbonated and/or nitrogenated water to flow from the second source through the second fluid line, a mixing point that fluidly couples the first fluid line to the second fluid line, the mixing point configured to allow the ultra-high gravity beverage to blend with the carbonated and/or nitrogenated water at the mixing point to produce the fermented beverage, a third fluid line fluidly coupled to the mixing point and configured to allow the fermented beverage to flow to a dispensing tap, a controller configured to provide one or more parameters to the beverage system in order to produce the fermented beverage, and a digital screen, configured to receive a signal from the controller, and configured to display information to a bartender regarding a status of the beverage system. The information may include pour, wait, drain, check keg, check water, check gas, and combinations thereof.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Beer" as used herein refers to alcoholic beer, low alcohol beer or non-alcoholic beer.

"Fermented beverage" as used herein refers to wine, hard cider, and/or beer.

"Ultra-High gravity beer" refers to a beer with over 10% alcohol by volume and/or over 10% real extract by weight. An ultra-high gravity beer may be made through fermentation alone, or via the removal of water and/or ethanol from a fermented beer.

"Ultra-High gravity beverage" or "uHGB" refers to a fermented beverage with over 10% alcohol by volume and/or over 10% real extract by weight. An ultra-high gravity beverage may be made through fermentation alone, or via the removal of water and/or ethanol from a fermented beverage.

"Real extract" refers to the non-ethanol, non-water compounds in beer and other fermented beverages.

"Check valve" and "one-way valve" are used interchangeably herein and refer to a valve that allows fluid to flow through the valve in one direction.

A "first source" as used herein may include a liquid feed of a first ultra-high gravity beverage, a container holding the first ultra-high gravity beverage, and/or a pump coupled to the liquid feed, a liquid feed line, and/or the container.

A "second source" as used herein may include a liquid feed of carbonated and/or nitrogenated water, a liquid feed of water or a source of purified water coupled to a carbonator and/or nitrogenator, a source of carbon dioxide and/or nitrogen gas, or a source of compressed gas, coupled to the carbonator and/or nitrogenator, and/or a pump coupled to the liquid feed, a liquid feed line, the carbonator and/or nitrogenator, and/or the source of the carbon dioxide and/or nitrogen gas and/or the source of the compressed gas.

A "third source" as used herein may include a liquid feed of a second ultra-high gravity beverage, a container holding the second ultra-high gravity beverage, and/or a pump coupled to the liquid feed, a liquid feed line, and/or the container.

Disclosed herein are systems and methods for dispensing finished beverage products produced by mixing ultra-high gravity beverages with one or more liquid streams. Although the below description refers to ultra-high gravity beer, other ultra-high gravity beverages may also be used.

Figure 1:
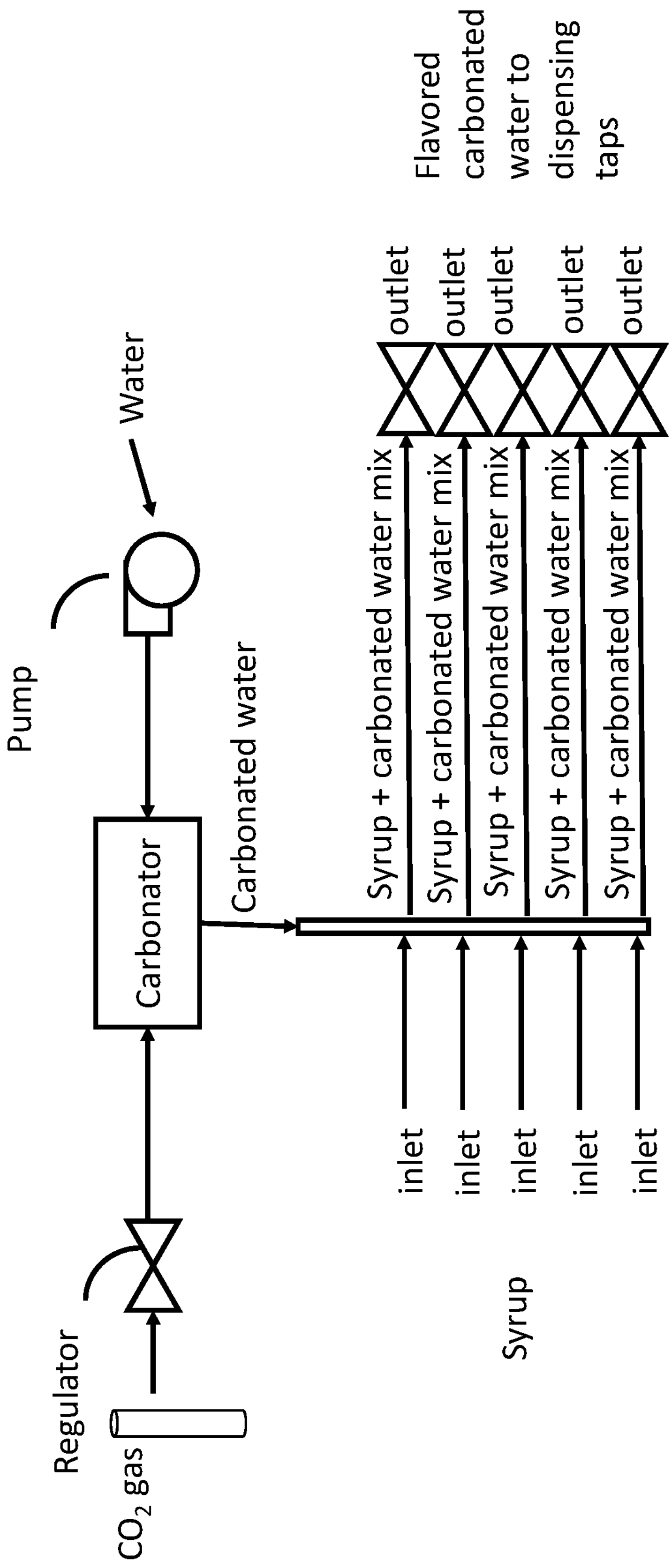
FIG. 1 is a diagram of a prior art post-mix dispensing system.
Figure 2:
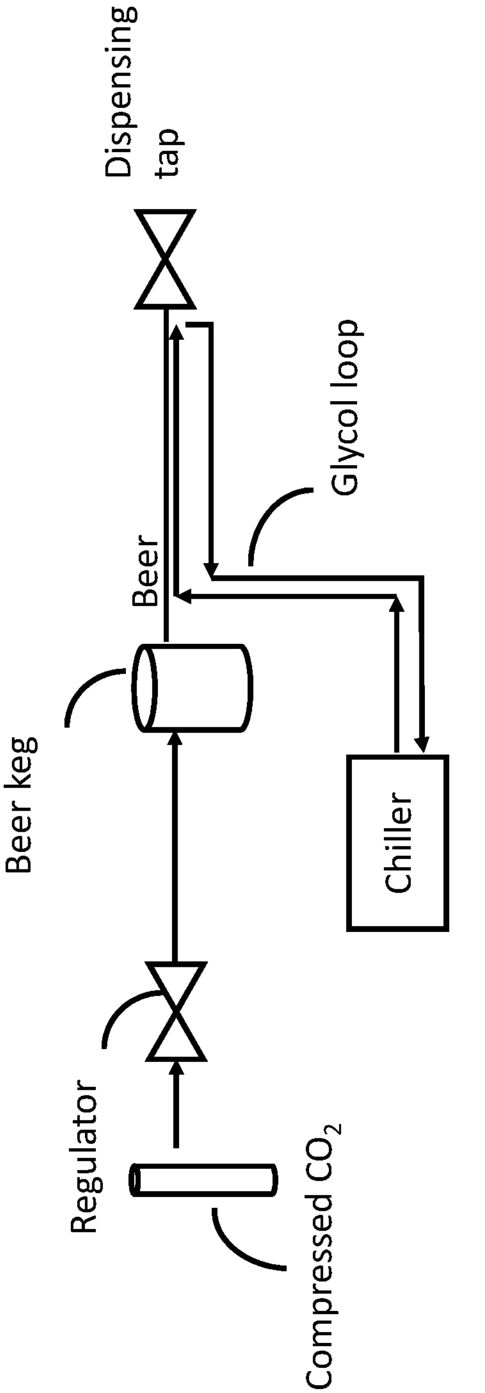
FIG. 2 is a diagram of a prior art beer tap system.
Figure 3:
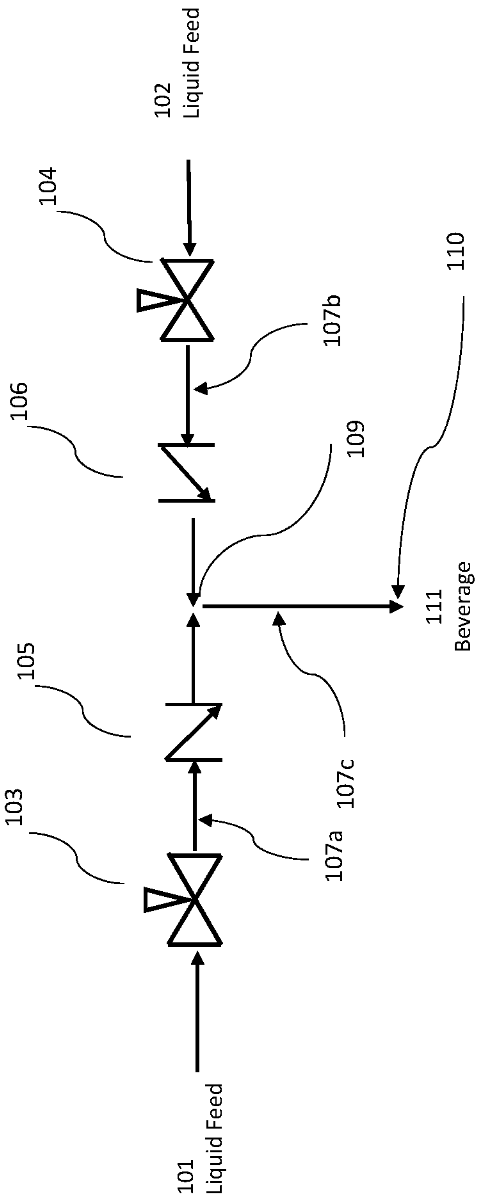
FIG. 3 is a diagram of a beverage system with more than one liquid feed according to embodiments of the present invention.

FIG. 3 is a diagram of a beverage system that produces a beer 111 from an ultra-high gravity beer mixed with a liquid. For example, the ultra-high gravity beer may be liquid feed 101 and the liquid may be liquid feed 102. The liquid feeds 101 and 102 are fluidly coupled to fluid lines 107*a* and 107*b*, respectively. The fluid lines 107*a* and 107*b* are fluidly coupled to one another and meet at a mixing point 109, which allows the ultra-high gravity beer within the fluid line 101 to mix or blend with the liquid within the fluid line 102 to produce the beer 111. Fixed or variable flow restrictors 103 and 104 may be used on the fluid lines 107*a* and 107*b* in order to control flow rate of the liquid from the liquid feeds 101 and 102 relative to each other in order to produce the desired quality of beer. Check valves 105 and 106 may be used on the fluid lines 107*a* and 107*b* in order to ensure no fluid flow from liquid feed 101 interacts with fluid flow from liquid feed 102 before the mixing point 109. Fluid flow from liquid feeds 101 and 102 may be controlled by pressure energy, as from a pressurized keg, or by pumping. After the fluid lines 107*a* and 107*b* meet at the mixing point 109, fluid line 107*c* allows the beer 111 to be delivered to a dispensing tap 110. If the liquid and/or the ultra-high gravity beer contain dissolved or entrained gases, the fluid line 107*c* may be lengthened between the mixing point 109 and the dispensing tap 110.

Figure 4:
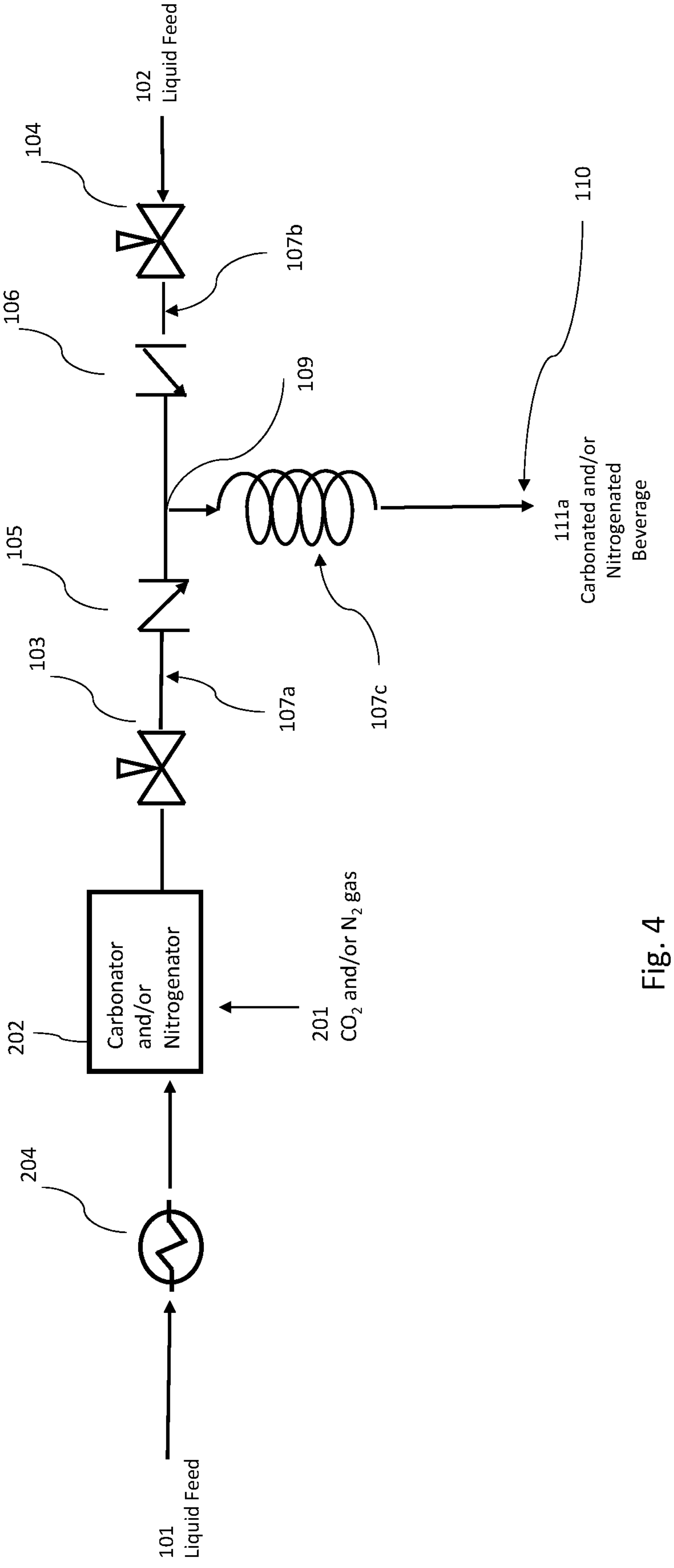
FIG. 4 is a diagram of a beverage system with more than one liquid feed where one of the feeds includes a gas according to embodiments of the present invention.

FIG. 4 is a diagram of a beverage system, similar to FIG. 3, that produces a beer 111 from an ultra-high gravity beer mixed with a liquid. In this case, the ultra-high gravity beer may be liquid feed 101 and the liquid may be liquid feed 102 or the ultra-high gravity beer may be liquid feed 102 and the liquid may be liquid feed 101. The fluid lines 107*a* and 107*b* may include check valves 105, 106 and fixed or variable flow restrictors 103, 104 as described above in FIG. 3. As shown in FIG. 4, the beverage system further includes a carbonator and/or nitrogenator 202 fed by $CO_2$ gas 201, which carbonates the fluid within the fluid line 107*a*. In an alternative embodiment, nitrogen gas (or a carbon dioxide nitrogen blend) may be used in place of $CO_2$ gas to create a beer 111 with entrained nitrogen. The beverage system may further include a heat exchanger 204, coupled to the fluid line 107*a*, to reduce the temperature of the fluid within the fluid line 107*a*, which allows for the desired degree of carbonation and/or nitrogenation. The heat exchanger 204 may be employed in combination with a coolant and cooling source (not shown) such as a glycol chiller. Alternately, an ice batch may be employed, which would be cooled by refrigerant cooling coils and would cool coils through which the liquid feed 101 and/or 102 would flow. Carbonation and/or nitrogenation may also occur before, during and/or after the cooling of the liquid feed 101 and/or 102. The fluid lines 107*a* and 107*b* are fluidly coupled to one another and meet at mixing point 109, which allows the carbonated and/or nitrogenated liquid within fluid line 107*a* to mix or blend with the liquid within fluid line 107*b* to produce a carbonated and/or nitrogenated beer 111*a*. Similar to FIG. 3, after fluid lines 107*a* and 107*b* meet at the mixing point 109, fluid line 107*c* delivers the carbonated and/or nitrogenated beer 111*a* to the dispensing tap 110. To maintain the quality of carbonation and/or nitrogenation from the mixing point 109 to the dispensing tap 110, an extended tube length may be used for the fluid line 107*c*. The heat exchanger 204 (or ice bath in other embodiments) is important when the dispensing rate is about 2 oz/s (59.1 mL/s) because significant cooling is required to pour at this rate. The liquid feed 101 and/or 102 may include a water supply, a carbonator and/or nitrogenator 202 and a pump (not shown), e.g., a positive displacement pump or a gas driven pump. The pump may increase the pressure of the carbonated and/or nitrogenated liquid so that the fluid can flow along the fluid lines 107*a* and/or 107*b*.

Figure 5:
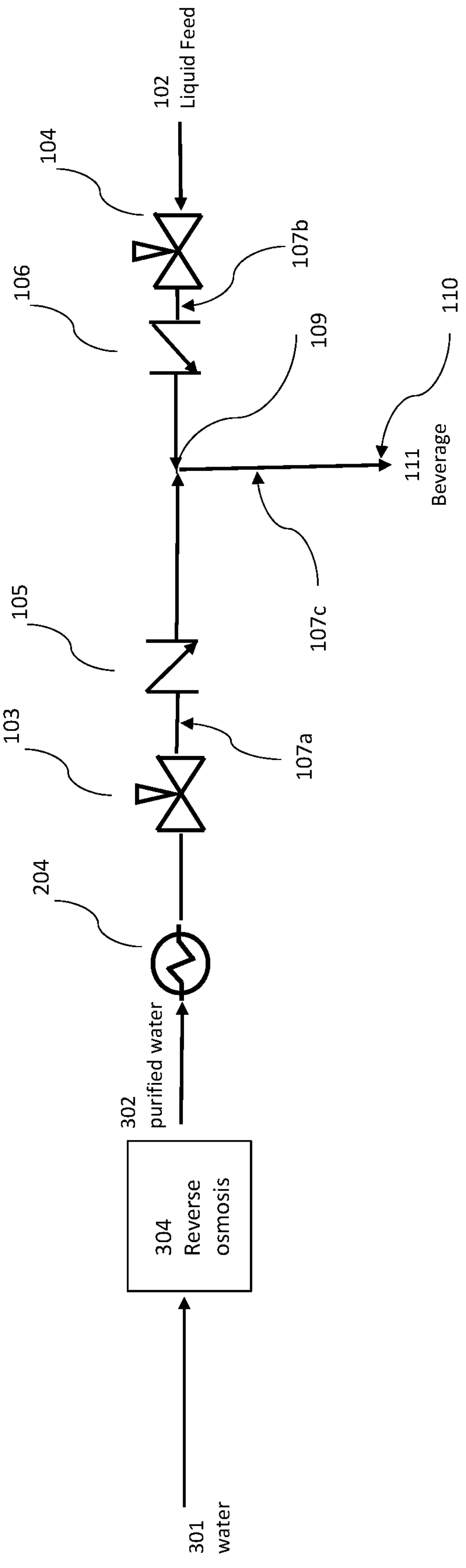
FIG. 5 is a diagram of a beverage system with more than one liquid feed where one of the feeds is a water source according to embodiments of the present invention.

FIG. 5 is a diagram of a beverage system, similar to FIG. 3, that produces a beer 111 from an ultra-high gravity beer mixed with a liquid. In this case, water 301 (e.g., from a municipal water source) is used as the liquid feed 101 (shown in FIGS. 3 and 4) and the ultra-high gravity beer is the liquid feed 102. The fluid lines 107*a* and 107*b* may include check valves 105, 106 and fixed or variable flow restrictors 103, 104 as described above in FIG. 3. As shown in FIG. 5, the beverage system may include a reverse osmosis unit 304 that purifies the water 310 within the fluid line 107*a* so that a purified water 302 within fluid line 107*a* mixes or blends with the ultra-high gravity beer within fluid line 107*b* at mixing point 109, to produce a beer 111, which is delivered by fluid line 107*c* to the dispensing tap 110. As an alternate to reverse osmosis, a sediment filter and/or carbon filter and/or ion exchange unit and/or a UV lamp may be sufficient to eliminate sediment, microbial contaminants and salts that may affect the flavor profile of the finished beer.

Figure 6:
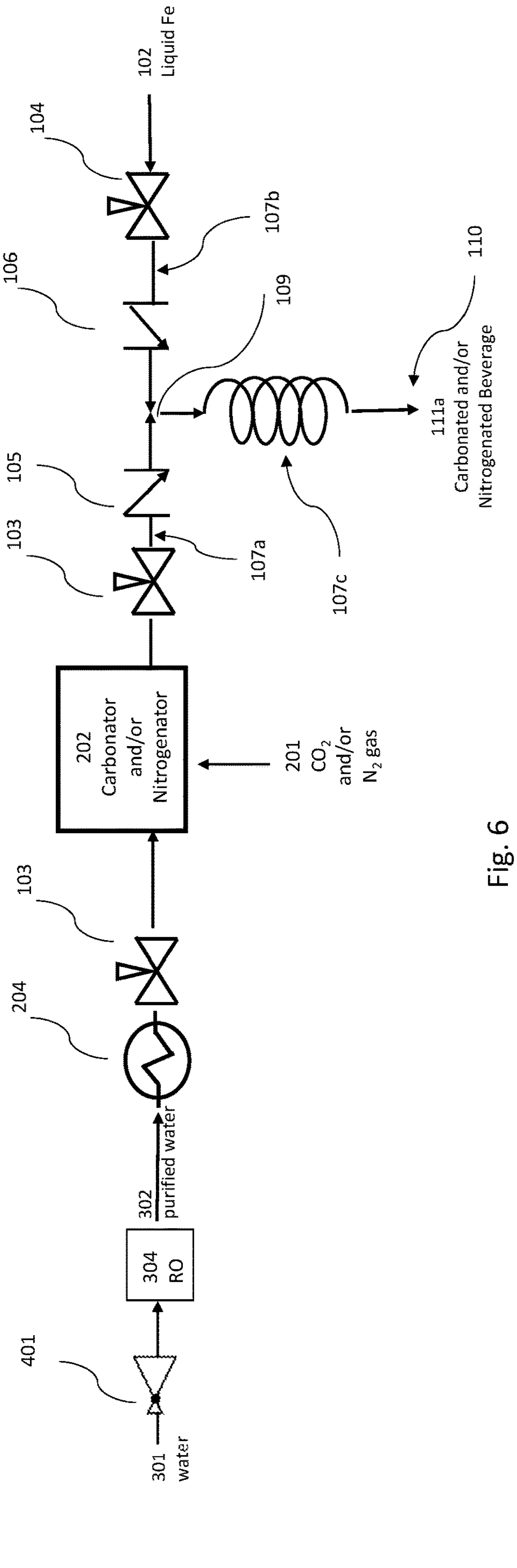
FIG. 6 is a diagram of a beverage system with more than one liquid feed where one of the feeds is a water source that includes a gas according to embodiments of the present invention.

FIG. 6 is a diagram of a beverage system that produces a carbonated and/or nitrogenated beer 111*a* from an ultra-high gravity beer mixed with a liquid, similar to FIG. 4 combined with FIG. 5. In this case, water 301 (e.g., from a municipal water source) is used as the liquid feed 101 (shown in FIGS. 3 and 4) and the ultra-high gravity beer is the liquid feed 102. The fluid lines 107*a* and 107*b* may include check valves 105, 106 and fixed or variable flow restrictors 103, 104 as described above in FIG. 3. As shown in FIG. 6, the beverage system may include a reverse osmosis (RO) unit 304 that purifies the water 310 within the fluid line 107*a* to produce a purified water 302. In addition, the beverage system may further include a carbonator and/or nitrogenator 202 using $CO_2$ and/or nitrogen gas 201, which carbonates and/or nitrogenates the fluid within the fluid line 107*a*. The beverage system may further include a heat exchanger 204 (e.g. plate heat exchanger, or an ice bath), as described above in FIG. 4, coupled to the fluid line 107*a*, to reduce the temperature of the fluid within the fluid line 107*a*, which allows for the desired degree of carbonation and/or nitrogenation. To maintain the quality of carbonation and/or nitrogenation from the mixing point 109 to the dispensing tap 110, an extended tube length may be used for the fluid line 107*c*. Pressure reducer 401 may be used to reduce the amount of water pressure from the water 301, which may come from a municipal source, to ensure the purified water 302 is delivered to carbonator and/or nitrogenator 202 with the desired amount of water pressure.

Figure 7:
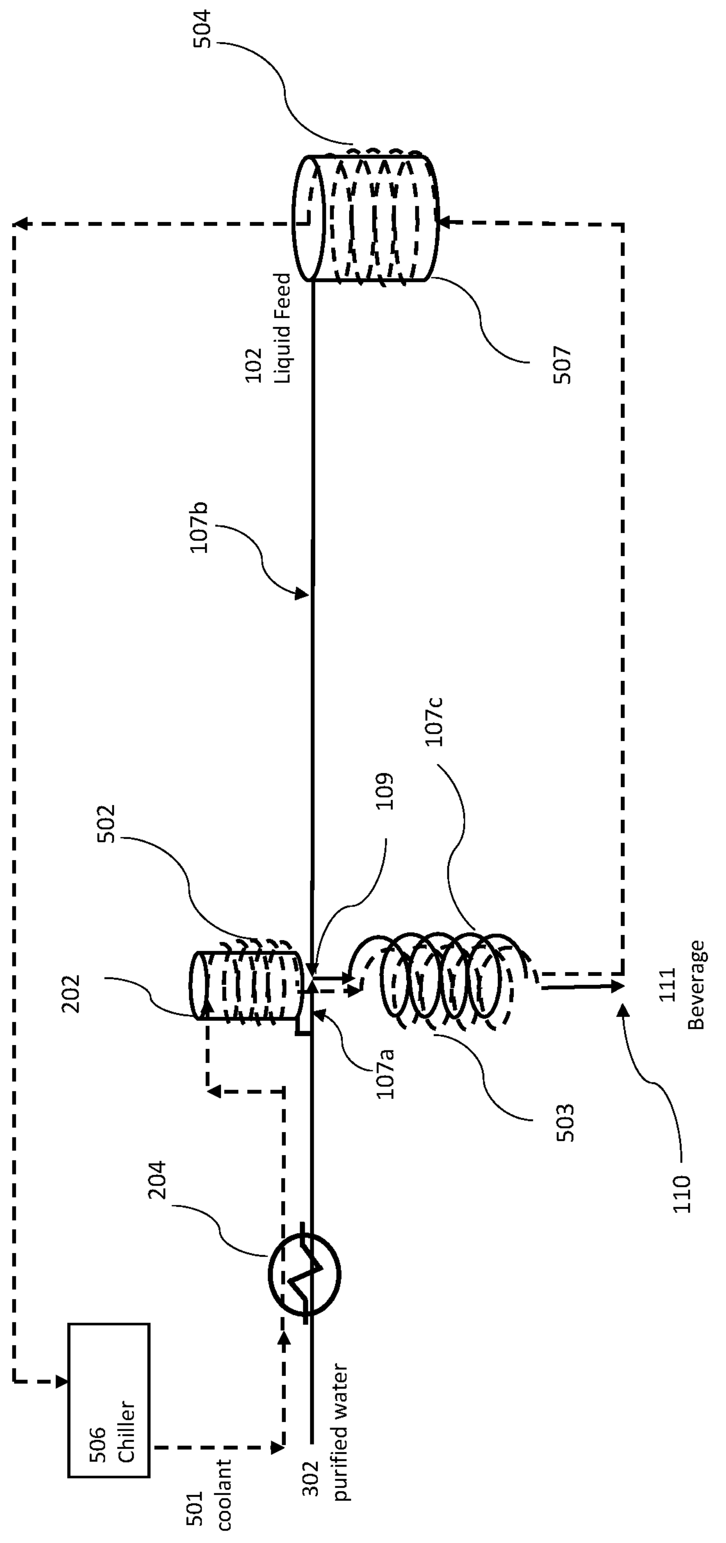
FIG. 7 is a diagram of a beverage system with a cooling system according to embodiments of the present invention.

FIG. 7 is a diagram of a cooling system which may be used with the beverage systems as described and depicted in FIGS. 3-6. As shown in FIG. 7, a coolant 501, e.g., glycol or water, may be pumped circuitously from a chiller 506, e.g., a glycol chiller or an ice bath. The coolant 501 may be pumped first to a coiled jacket 502 around carbonator and/or nitrogenator 202. Then, the coolant 501 may be passed alongside an extended tube length of the fluid line 107*c* in a parallel tube length 503. After the coolant 501 continues to cool the alcoholic beverage 111 to the dispensing tap 110, the coolant 501 may be sent to a coiled jacket 504 around container 507 containing liquid feed 102. In an alternative embodiment (not depicted), the coolant 501 may be the purified water 302 after passing through heat exchanger 204.

Figure 8:
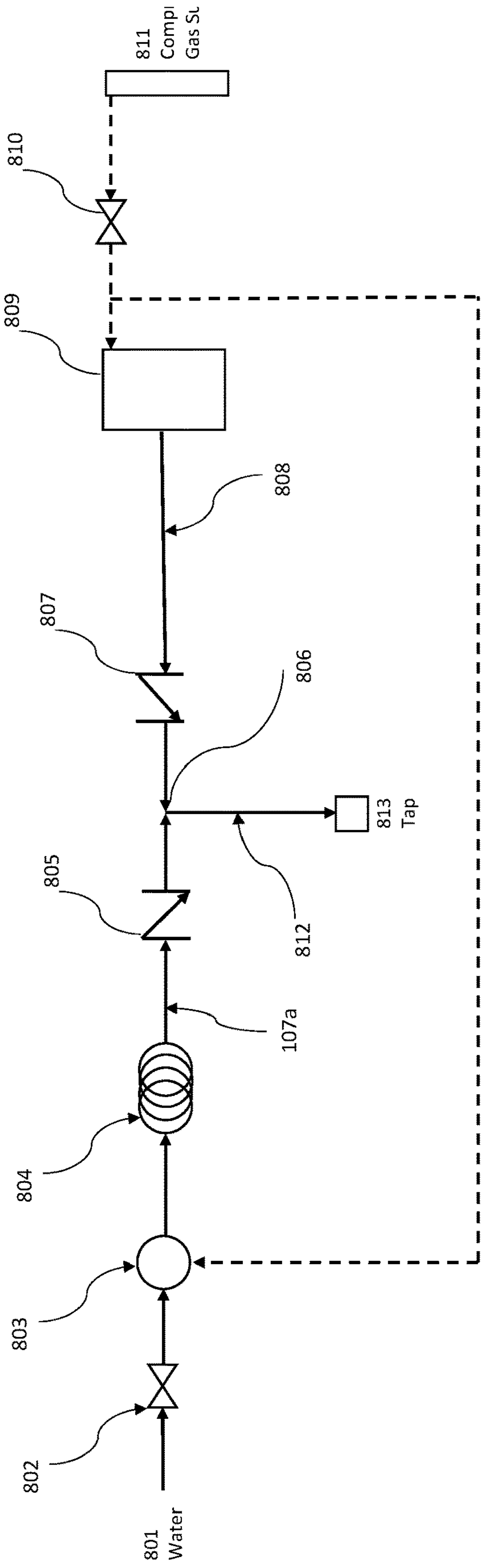
FIG. 8 is a diagram of a beverage system that dispenses beer by cooling and carbonating water and blending the cooled, carbonated and/or nitrogenated water with high gravity beer from a pressurized container according to embodiments of the present invention.

FIG. 8 is a diagram of a beverage system which may be used to cool and carbonate water and combine the cooled, carbonated and/or nitrogenated water with high gravity beer or high gravity non-alcoholic beer from a pressurized container 809. Water 801 enters a pressure regulator 802 where the pressure is controlled to about 10-30 psig before entering a carbonator and/or nitrogenator 803, which includes a liquid pump and a spray chamber (not shown) into which both water and carbon dioxide and/or nitrogen gas are introduced, and to which a pressure of between 25 and 45 psig is applied. The water may be cooled in cooling component 804, e.g., a heat exchanger or cooling coil submerged in an ice bath, before, during and/or after the carbonator and/or nitrogenator 803. The carbonated and/or nitrogenated water is preferably cooled to a temperature of between about 0° C. and about 5° C. Optionally, the cooling can be done before, during and/or after the carbonation and/or nitrogenation step. Cool, carbonated and/or nitrogenated water is then fed through one-way valve 805 and then on to a mixing point 806, where the cooled, carbonated and/or nitrogenated water mixes with high gravity beer. High gravity beer is contained within the pressurized container 809. The pressurized container 809 may be e.g., a polykeg, a bag in ball keg, a one-way keg, a steel keg or an aluminum keg. Gas pressure is provided from compressed gas supply 811 at a pressure that is set by pressure regulator 810. One pressure regulator 810 may be used to set the pressure for both the pressurized container 809 and the carbonator and/or nitrogenator 803. This configuration is beneficial in case the pressure regulator 810 has some internal drift errors then at least the relative pressure values between the pressurized container 809 and the carbonator and/or nitrogenator 803 should not substantially vary. High gravity beer flows from pressurized container 809 along fluid line 808 to a one-way valve 807 before blending at mixing point 806 with the cooled, carbonated and/or nitrogenated water. The mixture then flows along fluid line 812 to a dispensing tap 813. For a smooth pour, the pressure along the fluid line 812 should be between about 10 psig (68.9 kPa) and about 30 psig (206.8 kPa). If the pressure is below this range, then gas break-out can occur, resulting in a foamy pour. Notably, the set point of the pressure regulator 802 should be lower than the set point of pressure regulator 810, otherwise there will be no flow of gas into the carbonator and/or nitrogenator 803. The set point for pressure regulator 810 may be between about 25 psig (172.4 kPa) and about 40 psig (275.8 kPa). At pressures lower than about 25 psig (172.4 kPa), it is difficult to achieve sufficient carbonation and/or nitrogenation in the final, poured beer. At pressures above about 40 psig (275.8 kPa), there can be a foamy pour. If the pressure applied to the carbonator and/or nitrogenator 803 and the pressurized container 809 are about the same (e.g., as is shown in FIG. 8), then a flow control valve (not shown) may be added to fluid line 808 in order to control the flow rate of high gravity beer to the mixing point 806, and thus control the concentration of the beer at the dispensing tap 813. One-way or check valves 805 and 807 are important to the beverage system design. Without the presence of one way valves 805 and 807, the uHGB and the water on either side of the mixing point 806 mix when the dispensing tap 813 is closed between pours. This unintended mixing results in a pour that has bursts of either high or low concentration, which is less visually appealing and can affect the taste and consistency of the final, poured product. For optimal performance, one-way valves 805 and 807 should be located within about 0 to about 5 inches of the mixing point 806. Finally, fluid line 812 should be sized, in both length and diameter, to control the pour rate through the dispensing tap 813 to between about 0.25 fl. oz/s (7.4 mL/s) and about 2 fl. oz/s (59.1 mL/s). In general, a standard cooler-carbonator and/or nitrogenator may be retrofitted to achieve the beverage system design described in embodiments of the present invention. However, there are a few important design changes that must be made: i) the pressure regulator 802 at the water inlet is required to keep the feed pressure below the carbonator and/or nitrogenator pressure—typically city water pressure is above 40 psig (275.8 kPa), which would render impossible carbonation and/or nitrogenation at lower pressures of 25-40 psig (172.4-275.8 kPa) that were found to be ideal for this application, ii) the one-way or check valves 805 and 807 should be installed on either side of the mixing point 806, otherwise a smooth pour is not obtained, iii) the carbonator and/or nitrogenator 803 should be operated at lower pressure than is typically recommended for cooling and carbonating fluids (e.g., about 25-40 psig (172.4-275.8 kPa), rather than 60-120 psig (413.9-827.4 kPa)), iv) the fluid line 812 should be added of appropriate length and diameter to limit the fluid flow to between about 0.25 fl. oz/s (7.4 mL/s) and about 2 fl. oz/s (59.1 mL/s) to achieve an acceptable poured beer, otherwise the high speed of the pour can result in a foamy pour at the dispensing tap 813, and v) if using a pressurized container 809, e.g., a pressurized keg, the same pressure regulator 810 may be used to provide gas to the carbonator and/or nitrogenator 803 and the pressurized container 809, so that if the carbonator and/or nitrogenator 803 pressure drifts, at least the pressurized container 809 pressure will drift similarly, which minimizes the change in the concentration of the beer at the dispensing tap 813.

Figure 9:
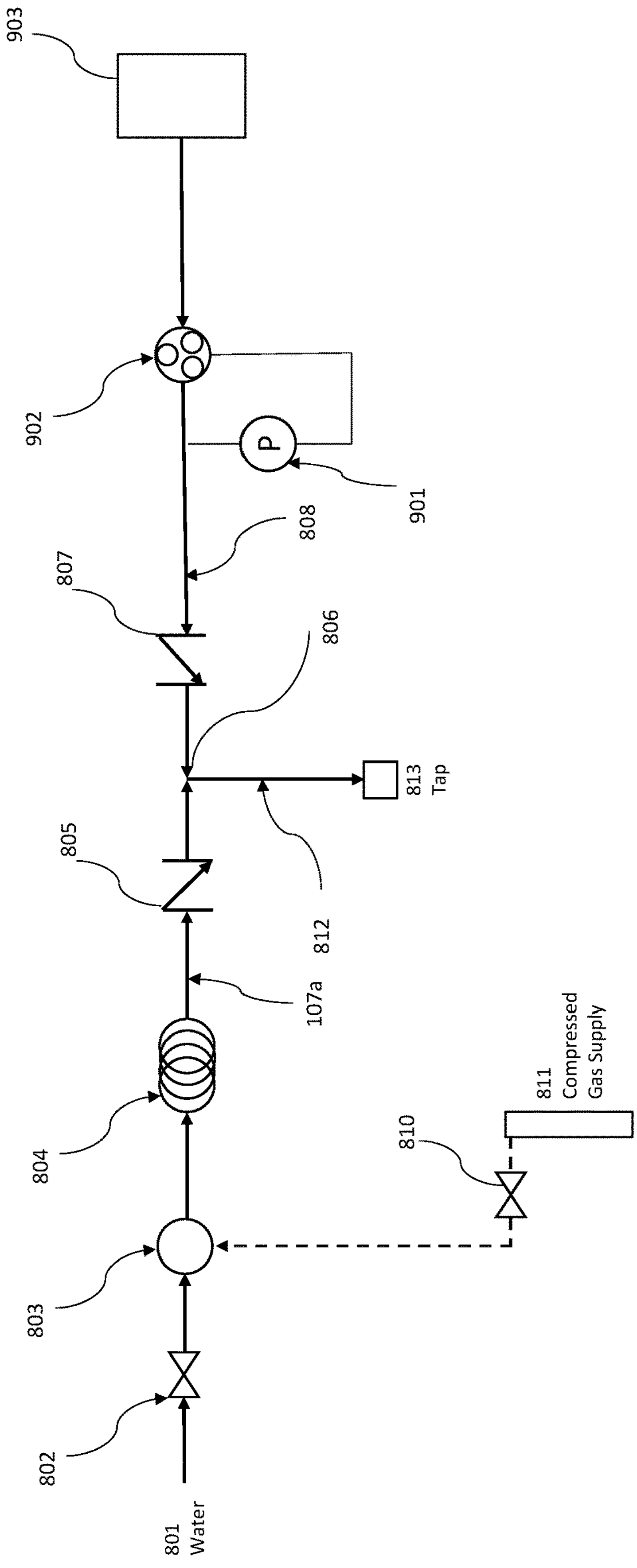
FIG. 9 is a diagram of a beverage system that dispenses beer by cooling and carbonating water and blending the cooled, carbonated and/or nitrogenated water with high gravity beer from a bag in box or poly-keg according to embodiments of the present invention.

FIG. 9 is a diagram of a beverage system similar to FIG. 8. The main difference compared to FIG. 8 is that the pressurized container 809 is replaced by a container 903 and a pump 902, e.g., a positive displacement pump or a gas driven pump, such as a pump that is typically used to dispense bag in box syrups that can draw high gravity beer from the container 903. Thus, the first source, which includes ultra-high gravity beer at a pressure of about 12 psig (82.7 kPa) to about 150 psig (1034.2 kPa), may include the pressurized container 809 or a pump 902 drawing from the container 903, where the container 903 may be at ambient pressure and the ultra-high gravity beer is pressurized by the pump 902. The container 903 may be, e.g., a poly keg, a bag in ball or a bag in box. The container 903 may be cooled by a jacket (not shown) that is supplied with water from an ice bath used to cool the liquid in cooling component 804, e.g., such as described in FIG. 7. In FIG. 9, pump 902 receives high gravity beer from container 903 and pumps the high gravity beer at a pressure between about 12 psig (82.7 kPa) to about 150 psig (1034.2 kPa), to check valve 807. Pressure switch 901 (which may alternately be a pressure transducer) provides a signal to pump 902 to turn on when the pressure drops below a set-point that corresponds to the dispensing tap 813 being opened. (Although shown on line 808, the pressure switch or transducer may also be placed on line 812 or on the carbonated and/or nitrogenated water line at any point after carbonation and/or nitrogenation.) This set point may be about 1-10 psig below the set point of pressure regulator 810. The flow rate of pump 902 may be controlled by setting the voltage that is provided to the pump 902, e.g., using a variable voltage power supply. High gravity beer is then blended at mixing point 806 with the cooled, carbonated and/or nitrogenated water and the mixture flows along fluid line 812 to the dispensing tap 813. In addition, there may be a flow meter measuring the flow of water or carbonated/nitrogenated water through the system before the blend point (not shown). This flow meter may send a signal to a microcontroller that in turn sends a signal to the positive displacement pump. The signal sent to the pump can be such that a constant blend ratio is maintained between the water and high gravity beer (or non-alcoholic beer) streams. This is helpful in ensuring a pour of constant concentration. If there is some variation in the flow rate of water from the carbonator and/or nitrogenator, the blended concentration can vary without such control, if the flow rate of the positive displacement pump is set to a constant value. Although one container 903 and pump 902 is shown, more than one container and/or pump may be used. For example, multiple bag in boxes may be used in parallel with a transfer valve and the transfer valve may allow automatic switching between the multiple containers 903, e.g., when one container is empty. One pump 902 may be used for the containers 903 or more than one pump 902 may be used.

Figure 10:
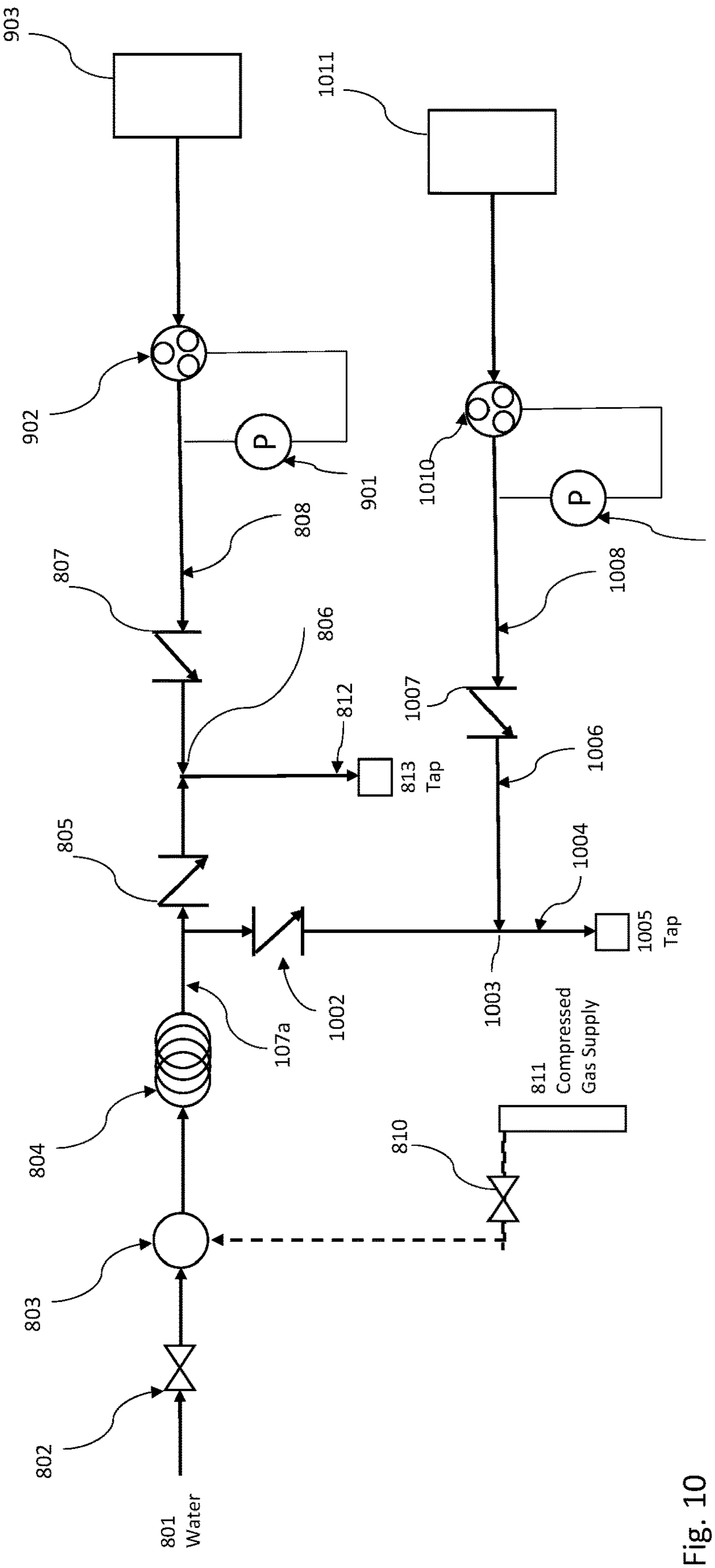
FIG. 10 is a diagram of a multi-tap beverage system that dispenses two different beers by cooling and carbonating water and blending the cooled, carbonated and/or nitrogenated water with a first high gravity beer and, separately, with a second high gravity beer according to embodiments of the present invention.

FIG. 10 is a diagram of a beverage system, similar to FIG. 9, which allows for multiple beers to be served from multiple dispensing taps 813, 1005. In addition to the configuration shown and described above with respect to FIG. 8 (with a pressurized container) or FIG. 9 (with a container and pump), FIG. 10 includes a second container 1011 feeding a second pump 1010 with a second pressure switch 1009 or includes a second pressurized container (not shown) similar to FIG. 8. Thus, the third source, which includes ultra-high gravity beer at a pressure of about 12 psig (82.7 kPa) to about 150 psig (1034.2 kPa), may include a pressurized container 1011 or the pump 1010 drawing from the container 1011, where the container 1011 may be at ambient pressure and the ultra-high gravity beer is pressurized by the pump 1010. As described above, the second pump 1010 draws high gravity beer from container 1011 and pumps the high gravity beer at a pressure between about 12 psig (82.7 kPa) to about 150 psig (1034.2 kPa) along fluid line 1008 to check valve 1007. Pressure switch 1009 provides a signal to pump 1010 to turn on when the pressure drops below a set-point that corresponds to the dispensing tap 1005 being opened. High gravity beer is then blended at a second mixing point 1003, with a cooled, carbonated and/or nitrogenated water coming through a second one-way valve 1002 and the mixture flows along fluid line 1004 to a second dispensing tap 1005. A benefit of this configuration is that the same carbonator and/or nitrogenator 803/cooler 804 system may be used to provide the cooled, carbonated and/or nitrogenated water for mixing with multiple high gravity beers, which saves space and energy. The beverage system may include a controller that is configured to provide different parameters, e.g., that may be stored in memory or a database, to be used for the different pour conditions for various types of beer. For example, the variable voltage supply of the positive displacement pump can be set to a value that would be tuned to a specific ultra-high gravity beer and specific pour conditions. The value may be set automatically by the controller or manually by a user, e.g., using a dial or a digital display. For example, for a carbonated and/or nitrogenated water flow of 0.75 oz/s, an ultra-high gravity beer at 20% ABV and a target pour ABV of 5% ABV, the voltage may be set such that the positive displacement pump provides a flow rate of 0.25 oz/s. In certain embodiments, there can be various pre-set voltages that allow a user of the beverage system to quickly toggle between different beers and obtain the desired pour concentration for each.

The controller may also provide a secure access to one or more of the components in the beverage system in order to assure that the beverage system is not compromised or tampered with. For example, brewers in general will be keen to know that their beer is being served at the desired strength so that the quality of the brand can be maintained and beers are not served strong or weak. To avoid the beverage system being tampered with, one or more components, such as the pump, may only be accessible through a secure login or passcode or may be located in a physical, secured structure that is only accessible through a physical key or a secure login. For example, the positive displacement pump may be located within an enclosure that can only be accessed with a physical key or passcode. In certain other embodiments, the enclosure may comprise a latch mechanism that may only be opened when an external signal is provided, e.g., through wife, through a cellular connection, or through a wired connection penetrating the enclosure.

The controller may also store the parameters used for the different pour conditions in a database or memory so that the pour conditions may be monitored or verified in a log or record of the beverage system. For example, there may be a flow meter installed on lines through which water, carbonated and/or nitrogenated water, carbon dioxide and/or nitrogen, or blended beer flow. In certain embodiments, the beverage system may include a digital memory storage device and data may be logged from one or more of the components in the system. For example, the pour conditions may be recorded from any or all of the flow meters, from pressure transducers, from refractive index sensors, from density sensors, from sonic sensors, from near infra-red sensors, from ethanol sensors, and/or from concentration monitoring devices including refractive index meters, near infra-red meters, sonic meters and/or density meters. In certain embodiments, the digital memory storage device may be located within an enclosure that may only be opened using i) a physical key, ii) a code, iii) an electronic signal from an external device. In certain embodiments, the data may be accessed remotely, thus allowing pour integrity and quantities to be monitored.

The various embodiments described above may include one or more pumps (e.g., a positive displacement pump or a gas driven pump) anywhere along the second fluid line and/or the third fluid line. For example, the pump(s) may be coupled to the outlet of the second source, the inlet or outlet at the mixing point, the inlet of the dispensing tap and/or anywhere along the length of the second or third fluid lines. Having one or more pumps on the fluid lines is helpful if the lines are long. Additionally, this allows the pressure on the carbonator and/or nitrogenator to be controlled independently of the flow rate in the second and/or third fluid lines. One or more pumps also allows the system to stop fluid flow if there is a system malfunction. For example, the fluid flow may be blocked on the second line if concentrate flow stops on the first line (e.g., as measured by a flow meter or pressure sensor on the first line), thus avoiding water being dispensed. Likewise, if $CO_2$ and/or nitrogen stops flowing (e.g., as measured by a flow meter or pressure gauge on the $CO_2$ and/or nitrogen line) the flow of the concentrate (first line) and/or the carbonated and/or nitrogenated water (second line) may be stopped.

Figure 11:
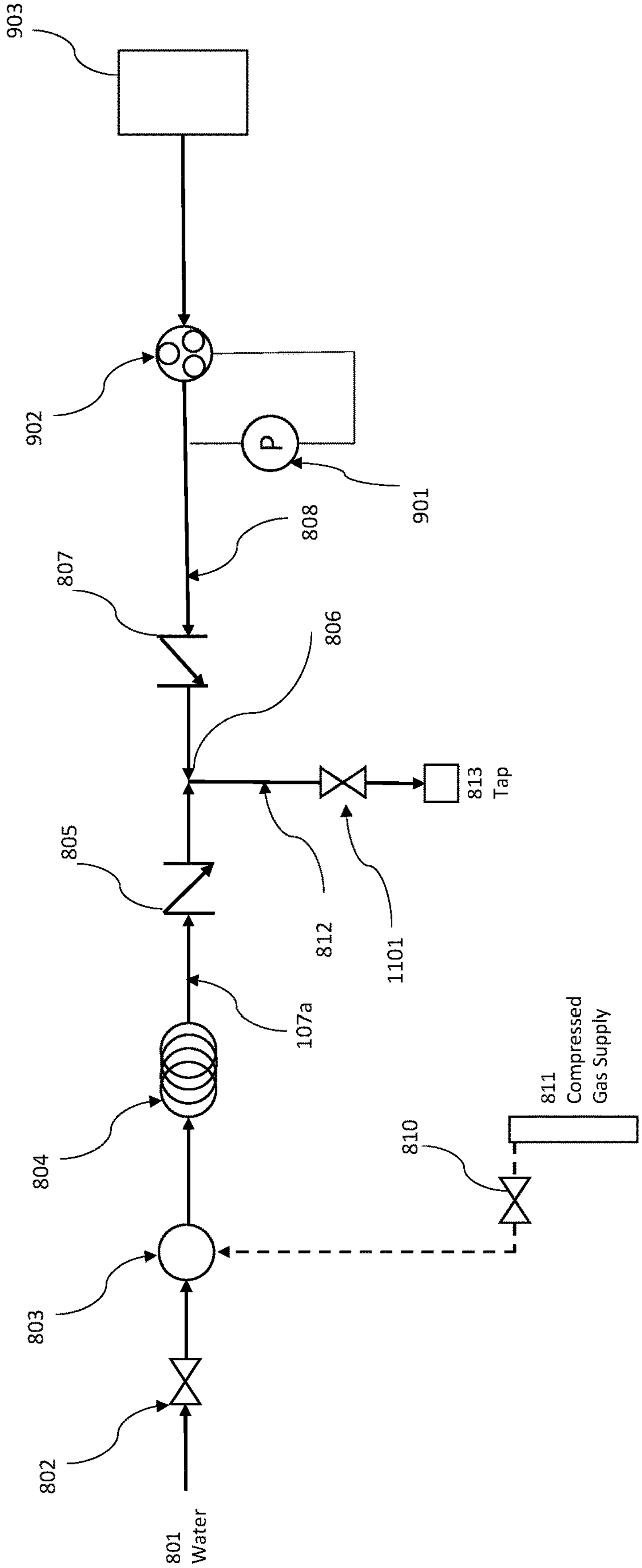
FIG. 11 is a diagram of a beverage system as per FIG. 9, that includes a valve on the fluid line to the tap or within the tap according to embodiments of the present invention.

FIG. 11 is a diagram of a beverage system similar to FIG. 9, with the addition of a valve 1101 on the fluid line 812 to the tap or within tap 813. The valve 1101 may take an open, partially open or closed position. In certain embodiments, the valve 1101 may be electronically actuated by a signal from a controller. The valve 1101 incorporates a number of failsafe measures to ensure that out of specification beer (e.g., under carbonated and/or nitrogenated beer or beer of the wrong concentration) is not poured into a customer's glass. While it is possible to shut down the supply of water and concentrate well upstream of the tap (for example by stopping pump 902), fluid still flows through open tap 813 because the fluid is carbonated and/or nitrogenated and will naturally depressurize and be dispensed. Thus, the only way to stop flow to a glass is to place a valve close to or within the tap. There are a number of examples where this valve 1101 may be actuated: i) the keg of ultrahigh gravity beer is exhausted, which may be detected either via a voltage signal from pump 901 or via a pressure transducer on line 808 or 812, ii) there is gas in the ultra-high gravity beer line 808 (creating a risk of an overly dilute beer being sent to tap 813), iii) the water supply 801 is cut off (which could, for example, be detected via a flow meter on the carbonated and/or nitrogenated water line), iv) the gas supply is cut off or exhausted (which could, for example, be detected via a pressure transducer connected to the gas line or the carbonator and/or nitrogenator). In any of these scenarios, a signal may be sent to valve 1101 to immediately prevent the flow of beer from the tap 813. Further, if one of these scenarios occurs, it can be beneficial to signal to the bartender the specific issue at hand and how it may be remedied.

Figure 12:
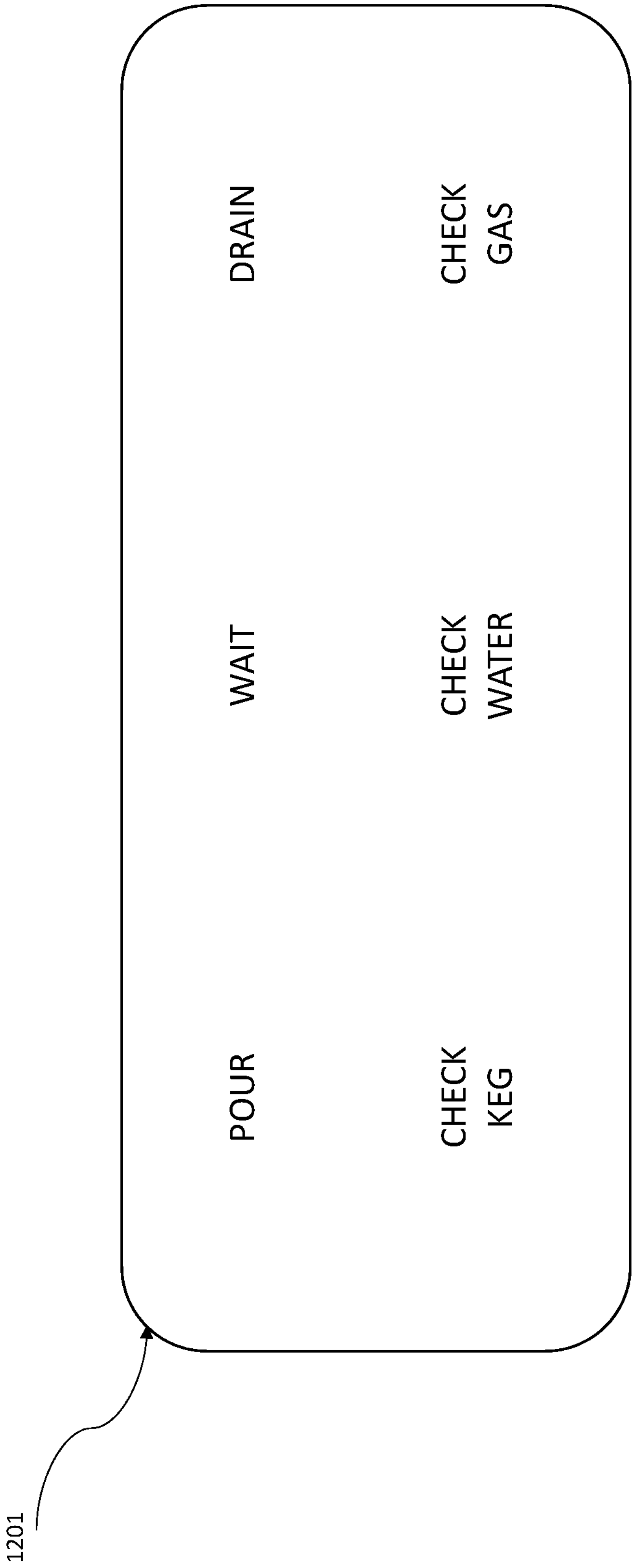
FIG. 12 is a diagram of a bartender facing screen associated with a beverage system according to embodiments of the present invention.

FIG. 12 is an electronic display 1201, that is connected to the controller of the beverage system described in FIG. 11. This display 1201 provides information to the bartender regarding the status of the beverage system. This information may provide instructions and/or guidance to the bartender. For example, if a water shortage is detected, there is an indicator for a water shortage, likewise for the gas or the ultrahigh gravity beer supply. Further, there may be indicators instructing the bartender whether to i) Pour—meaning dispense on-specification beer, ii) Wait—meaning the bartender should wait and diagnose any issues at hand, and/or iii) Drain—meaning the bartender should dispense beer to a waste container until the indicator changes. For example, when there is a gas bubble in the ultrahigh gravity beer line, a variation in the voltage from pump 902 or a variation in flow through a flow meter on fluid line 808 may be observed as the bubble goes through the pump. The controller recognizes this situation, turns off the pump 902 and closes valve 1101 in order to prevent further beer from being dispensed. The bartender sees the Pour indicator turn off and the Drain indicator turn on instead. The bartender then pours off-specification beer to a waste container. Once bubbles are flushed, the pump voltage returns to normal and the controller appropriately changes the bartender's indicator to Pour, once sufficient off-specification beer has been poured through the beverage system.

Figure 13:
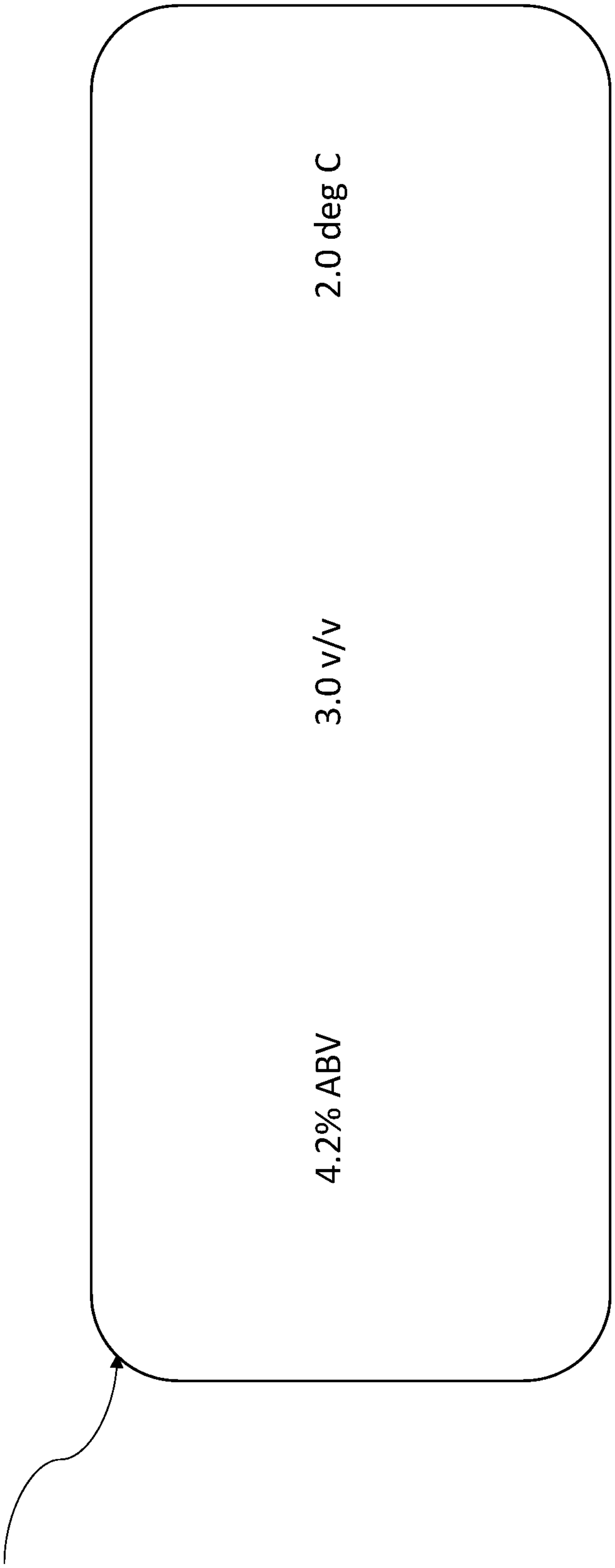
FIG. 13 is a diagram of a consumer facing screen associated with a beverage system according to embodiments of the present invention.

As an additional feature, since the system of FIG. 9 is gathering data via a controller, there is an opportunity to share certain data with the consumer to provide a higher quality draft experience. FIG. 13 shows consumer facing display 1301, connected to the controller, that shows real time parameters such as ABV (alcohol by volume), carbon dioxide ($CO_2$) content (e.g., expressed as $volume_{CO2}/volume_{Liquid}$), calories, pour flow rate, and/or temperature. Display 1301 may also show nitrogen content (not shown) and/or remaining dispensable volume (not shown). These parameters may be directly measured or may be calculated, i.e., derived, via measured quantities and known quantities (e.g., the beer keg's % ethanol). For example, the remaining dispensable volume may be displayed (such as the number of pints remaining in the keg), which can be determined using data obtained from the concentrate flow meter along with the blend ratio. In some embodiments, the controller provides an electronic signal actuating valve 1101 when the carbon dioxide content, nitrogen content, alcohol by volume, temperature, or pour flow rate deviates by more than 5% from a target value for any one of the aforementioned parameters. The benefit of this consumer facing display 1301 is that the display 1301 gives the consumer real-time information on the quality of beer being dispensed. I is also useful to beer brands to ensure consistency across the draft experience for all of their consumers.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A beverage system that produces a beer from two or more liquid streams, the beverage system comprising:
  - a first source comprising ultra-high gravity beer at a pressure of about 12 psig (82.7 kPa) to about 150 psig (1034.2 kPa);
  - a second source comprising a carbonated and/or nitrogenated water at a pressure of about 12 psig (82.7 kPa) to about 150 psig (1034.2 kPa) and a temperature of about 0 to about 8° C.;
  - a first fluid line fluidly coupled to the first source and configured to allow the ultra-high gravity beer to flow from the first source through the first fluid line;
  - a second fluid line fluidly coupled to the second source and configured to allow the carbonated and/or nitrogenated water to flow from the second source through the second fluid line;
  - a mixing point that fluidly couples the first fluid line to the second fluid line, the mixing point configured to allow the ultra-high gravity beer to blend with the carbonated and/or nitrogenated water at the mixing point to produce the beer;
  - a first one-way valve along the first fluid line between the first source and the mixing point;
  - a second one-way valve along the second fluid line between the second source and the mixing point; and
  - a third fluid line fluidly coupled to the mixing point and configured to allow the beer to flow to a dispensing tap, wherein the third fluid line has a length of about 1 foot (0.3 m) to about 150 feet (45.7 m) and an inner diameter of about $1/8^{th}$ of an inch to about $5/8^{th}$ of an inch for at least a portion of the third fluid line.

P2. The beverage system according to claim P1, wherein the first source comprising the ultra-high gravity beer is at a pressure of about 12 psig (82.7 kPa) to about 60 psig (413.7 kPa).

P3. The beverage system according to claim P1 or P2, wherein the second source comprising the carbonated and/or nitrogenated water is at a pressure of about 12 psig (82.7 kPa) to about 60 psig (413.7 kPa).

P4. A beverage system according to any one of claims P1-P3, wherein the second source comprising the carbonated and/or nitrogenated water is at a pressure of about 25 psig (172.4 kPa) to about 40 psig (275.8 kPa).

P5. The beverage system according to any one of claims P1-P4, wherein the third fluid line has a length of about 1 foot (0.3 m) to about 50 feet (15.2 m).

P6. The beverage system according to any one of claims P1-P5, wherein the second fluid line comprises a positive displacement pump.

P7. The beverage system according to any one of claims P1-P6, wherein the third fluid line comprises a positive displacement pump.

P8. A beverage system according to any one of claims P1-P7, wherein the length and the inner diameter of the third fluid line are configured to provide for a flow rate of the beer at the dispensing tap of between about 0.5 (15 mL) to about 3 fluid ounces (89 mL) per second.

P9. A beverage system according to claim P8, wherein the length and the inner diameter of the third fluid line are configured to provide for the flow rate of the beer at the dispensing tap of between about 1.7 (50 mL) to about 2.3 fluid ounces (68 mL) per second.

P10. A beverage system according to any one of claims P1-P9, wherein the second source includes a water supply, a carbonator and/or nitrogenator, and a water pressure regulator between the water supply and the carbonator and/or nitrogenator, and wherein the water pressure regulator is configured to regulate pressure of water from the water supply to the carbonator and/or nitrogenator to be about 10 psig (69 kPa) to about 30 psig (207 kPa).

P11. A beverage system according to any one of claims P1-P10, further comprising a fixed or variable flow restrictor coupled to the first fluid line and configured to achieve an alcohol concentration of between about 3% to about 7% alcohol by volume and/or a real extract concentration of between about 1.5% to about 5% real extract by weight in the beer.

P12. A beverage system according to any one of claims P1-P11, wherein the first source is at a temperature of between about 0° C. to about 8° C.

P13. A beverage system according to any one of claims P1-P12, wherein the ultra-high gravity beer is held within a container, and the container is (a) a pressurized keg or (b) a keg or bag in box at about ambient pressure and coupled to a pump configured to draw the ultra-high gravity beer from the keg or the bag in box to the first one-way valve.

P14. A beverage system according to claim P13, wherein the pump is (a) a positive displacement pump configured to receive a signal from a pressure switch or a pressure transducer or (b) a gas driven pump.

P15. A beverage system according to claim P13, wherein the keg is a bag-in-ball keg. P16. A beverage system according to claim P13, wherein the container is insulated and cooled.

P17. A beverage system according to claim P16, wherein the container is insulated with an insulating material comprising neoprene.

P18. A beverage system according to claim P17, wherein the container is insulated with an insulating material which has a thickness of between about 0.5 cm to about 3 cm.

P19. The beverage system according to claim P13, wherein the container is coupled via a switch valve to a second container holding the ultra-high gravity beer.

P20. A beverage system according to any one of claims P1-P19, wherein the temperature of the carbonated and/or nitrogenated water is achieved by (a) a cooling coil submersed in an ice bath, the cooling coil being coupled to a carbonator and/or nitrogenator, or (b) a heat exchanger, the heat exchanger being coupled to a carbonator and/or nitrogenator.

P21. A beverage system according to claim P20, wherein the ice bath or the heat exchanger is configured to provide cooling for (a) the carbonated and/or nitrogenated water, (b) the third fluid line, and/or (c) the carbonator and/or nitrogenator.

P22. A beverage system according to claim P20 or P21, wherein the heat exchanger is a plate heat exchanger.

P23. A beverage system according to claim P20 or P21, wherein the heat exchanger is a tube heat exchanger.

P24. A beverage system according to claim P20, wherein the ice bath or the heat exchanger is configured to provide cooling for the third fluid line.

P25. A beverage system according to claim P24, wherein the cooling of the third fluid line is achieved via a cooling coil in the ice bath.

P26. A beverage system according to any one of claims P1-P25, further comprising a treatment system coupled to the second fluid line, wherein the treatment system is selected from the group consisting of reverse osmosis, carbon filtration, UV treatment, ion exchange treatment and/or microfiltration.

P27. A beverage system according to any one of claims P1-P26, wherein the ultra-high gravity beer is between about 15% to about 40% alcohol by volume.

P28. A beverage system according to any one of claims P1-P27, further comprising a trap coupled to the first fluid line and/or the second fluid line and configured to collect sediment within the carbonated and/or nitrogenated water and/or the ultra-high gravity beer.

P29. A beverage system according to any one of claims P1-P28, further comprising a sensor located between the mixing point and the dispensing tap or located within the dispensing tap and configured to measure alcohol concentration within the beer.

P30. A beverage system according to claim P29, wherein the sensor is selected from the group consisting of a refractometer, a density meter, and/or a sound velocity meter.

P31. A beverage system according to any one of claims P1-P30, wherein the third fluid line has a length of about 3 feet (0.9 m) to about 30 feet (9.1 m).

P32. A beverage system according to any one of claims P1-P31, wherein carbonation and/or nitrogenation of the water is between about 1 to about 5 volumes of gas per volumes of liquid.

P33. A beverage system according to claim P32, wherein the carbonation and/or nitrogenation of the water is between about 2 to about 3.5 volume of gas per volumes of liquid.

P34. A beverage system according to any one of claims P1-P33, wherein the second source further includes a compressed gas supply, a carbonator and/or nitrogenator, and a gas pressure regulator, wherein the gas pressure regulator is between the compressed gas supply and the carbonator and/or nitrogenator, wherein the gas pressure regulator is configured to regulate pressure of gas to the carbonator and/or nitrogenator to be about 25 psig (172.4 kPa) to about 40 psig (275.8 kPa).

P35. A beverage system according to claim P35, wherein the ultra-high gravity beer is held within a pressurized container, and the gas pressure regulator is between the compressed gas supply and the pressurized container and is further configured to regulate the pressure of the gas to the pressurized container.

P36. A beverage system according to any one of claims P1-P33, wherein the second source comprises a water supply, a carbonator and/or nitrogenator, and a positive displacement pump, wherein the carbonator and/or nitrogenator is between the water supply and the positive displacement pump.

P37. A beverage system according to any one of claims P1-P36, wherein the first one-way valve and/or the second one-way valve is located about 0 to about 5 inches (12.7 cm) from the mixing point.

P38. A beverage system according to claim P1, wherein the system produces a second beer, the system further comprising:

a third source comprising a second ultra-high gravity beer at a pressure of about 12 psig (82.7 kPa) to about 150 psig (1034.2 kPa);

a fourth fluid line fluidly coupled to the third source and configured to allow the second ultra-high gravity beer to flow from the third source through the fourth fluid line;

a second mixing point that fluidly couples the second fluid line to the fourth fluid line, the second mixing point configured to allow the second ultra-high gravity beer to blend with the carbonated and/or nitrogenated water at the second mixing point to produce the second beer;

a third one-way valve along the fourth fluid line between the third source and the second mixing point;

a fourth one-way valve along the second fluid line between the second source and the second mixing point; and a fifth fluid line fluidly coupled to the second mixing point and configured to allow the second beer to flow to a second dispensing tap, wherein the fifth fluid line has a length of about 1 foot (0.3 m) to about 150 feet (45.7 m) and an inner diameter of about ⅛$^{th}$ (3.2 mm) of an inch to about ⅝$^{th}$ of an inch (15.9 mm) for at least a portion of the fifth fluid line.

P39. The beverage system according to claim P38, wherein the third source comprising the second ultra-high gravity beer is at a pressure of about 12 psig (82.7 kPa) to about 60 psig (413.9 kPa).

P40. The beverage system according to any one of claims P38-P39, wherein the fifth fluid line has a length of about 1 foot (0.3 m) to about 50 feet (15.2 m).

P41. A beverage system according to any one of claims P1-P40, further comprising a controller configured to provide one or more parameters to the beverage system in order to produce the beer.

P42. A beverage system according to any one of claims P1-P41, further comprising a controller configured to record one or more parameters from the beverage system.

P43. A beverage system according to claim P41 or P42, wherein the one or more parameters include parameters for an input voltage to a positive displacement pump, a pressure transducer, a flow meter, a refractive index sensor, a density sensor, a sonic sensor, a near infra-red sensor, and/or an ethanol sensor.

P44. A beverage system according to any one of claims P1-P43, further comprising a controller configured to provide a secure access to the beverage system.

P45. A beverage system according to claim P44, wherein the controller provides secure access to a pump that is configured to draw the ultra-high gravity beer through the first fluid line.

P46. A beverage system according to any one of claims P41-P45, wherein the controller is held within a secure enclosure.

P47. A beverage system according to any one of claims P41-P46, wherein the one or more parameters provided to the beverage system and/or the one or more parameters recorded from the beverage system may be remotely accessed via a wifi or cellular connection.

P48. A beverage system according to any one of claims P43-P47, wherein the flow meter measures flow of water, carbonated water and/or nitrogenated water and provides an output signal to the controller, and the controller provides an output signal to the positive displacement pump in order to cause an alcohol concentration and/or a real extract concentration of the beer to be maintained approximately constant.

P49. A beverage system according to claim P16, wherein the container is insulated with an insulating material.

P50. A beverage system according to claim P49, wherein the insulating material comprises a material selected from the group consisting of a closed-cell foam, an open-cell foam, and combinations thereof.

P51. A beverage system according to claim P49, wherein the insulating material comprises a material selected from the group consisting of neoprene, a closed-cell polystyrene foam, and combinations thereof.

Metric values disclosed parenthetically herein have been calculated based on the corresponding United States unit system values, such as psig, inch, foot, ounce, fluid ounce, and the like. In case of any discrepancy between the metric values and the United States unit system values, the United States unit system values are decisive.

Embodiments of the present invention described above are intended to be merely exemplary; numerous variations and modifications will be apparent to those skilled in the art. All such variations and modifications are intended to be within the scope of the present invention as defined in the appended claims.

What is claimed is:

1. A beverage system that produces a fermented beverage from two or more liquid streams, the beverage system comprising:

a first source comprising an ultra-high gravity beverage, the ultra-high gravity beverage being a fermented beverage with over 10% alcohol by volume and/or over 10% real extract by weight, the real extract being non-ethanol, non-water compounds in said ultra-high gravity beverage;

a second source comprising a carbonated and/or nitrogenated water at a pressure of 12 psig (82.7 kPa) to 150 psig (1034.2 kPa) and a temperature of 0 to 8° C.;

a first fluid line fluidly coupled to the first source and configured to allow the ultra-high gravity beverage to flow from the first source through the first fluid line;

a second fluid line fluidly coupled to the second source and configured to allow the carbonated and/or nitrogenated water to flow from the second source through the second fluid line;

a mixing point that fluidly couples the first fluid line to the second fluid line, the mixing point configured to allow the ultra-high gravity beverage to blend with the carbonated and/or nitrogenated water at the mixing point to produce the fermented beverage;

a first one-way valve along the first fluid line between the first source and the mixing point located 0 to 5 inches (0 to 12.7 cm) from the mixing point;

a second one-way valve along the second fluid line between the second source and the mixing point located 0 to 5 inches (0 to 12.7 cm) from the mixing point; and a third fluid line fluidly coupled to the mixing point and configured to allow the fermented beverage to flow to a dispensing tap, wherein the third fluid line has a length of 1 foot (0.3048 m) to 150 feet to (45.72 m) and an inner diameter of $1/8^{th}$ of an inch (3.2 mm) to $5/8^{th}$ of an inch (15.9 mm) for at least a portion of the third fluid line.

2. The beverage system according to claim 1, wherein the third fluid line has a length of 1 foot (0.30 m) to 50 feet (15.2 m) and optionally comprises a pump.

3. The beverage system according to claim 1, wherein the second fluid line comprises a pump.

4. The beverage system according to claim 1, wherein the length and the inner diameter of the third fluid line are configured to provide for a flow rate of the fermented beverage at the dispensing tap of between 0.5 (14.8 mL) to 3 (88.7 mL) or from 1.7 (50.3 mL) to 2.3 (68 mL) fluid ounces per second.

5. The beverage system according to claim 1, wherein the ultra-high gravity beverage is held within a container, and the container is (a) a pressurized keg or (b) a keg or bag in box at ambient pressure and coupled to a pump configured to draw the ultra-high gravity beverage from the keg or the bag in box to the first one-way valve.

6. The beverage system according to claim 1, wherein the temperature of the carbonated and/or nitrogenated water is achieved by (a) a cooling coil submersed in an ice bath, the cooling coil being coupled to a carbonator and/or nitrogenator, or (b) a heat exchanger, the heat exchanger being coupled to the carbonator and/or nitrogenator, and wherein the ice bath or the heat exchanger is configured to provide cooling for (a) the carbonated and/or nitrogenated water, (b) the third fluid line, and/or (c) the carbonator and/or nitrogenator.

7. The beverage system according to claim 6, wherein the ice bath or the heat exchanger is configured to provide cooling for the third fluid line.

8. The beverage system according to claim 7, wherein the cooling of the third fluid line is achieved via a cooling coil in the ice bath.

9. The beverage system according to claim 1, further comprising a sensor located between the mixing point and the dispensing tap or located within the dispensing tap and configured to measure alcohol concentration within the fermented beverage.

10. The beverage system according to claim 1, wherein the second source comprises a water supply, a carbonator and/or nitrogenator, and a pump, wherein the carbonator and/or nitrogenator is between the water supply and the pump.

11. The beverage system according to claim 1, wherein the system produces a second fermented beverage, the system further comprising:

a third source comprising a second ultra-high gravity beverage at a pressure of 12 psig (82.7 kPa) to 150 psig (1034.2 kPa);

a fourth fluid line fluidly coupled to the third source and configured to allow the second ultra-high gravity beverage to flow from the third source through the fourth fluid line;

a second mixing point that fluidly couples the second fluid line to the fourth fluid line, the second mixing point configured to allow the second ultra-high gravity beverage to blend with the carbonated and/or nitrogenated water at the second mixing point to produce the second fermented beverage;

a third one-way valve along the fourth fluid line between the third source and the second mixing point;

a fourth one-way valve along the second fluid line between the second source and the second mixing point; and a fifth fluid line fluidly coupled to the second mixing point and configured to allow the second fermented beverage to flow to a second dispensing tap, wherein the fifth fluid line has a length of 1 foot (0.30 m) to 150 (45.7 m) feet and an inner diameter of ⅛$^{th}$ of an inch (3.2 mm) to ⅝$^{th}$ of an inch (15.9 mm) for at least a portion of the fifth fluid line.

12. The beverage system according to claim 1, further comprising a controller configured to provide one or more parameters to the beverage system in order to produce the fermented beverage and/or a controller configured to record one or more parameters from the beverage system, wherein the one or more parameters includes parameters for an input voltage to a positive displacement pump, a pressure transducer, a flow meter, a refractive index sensor, a density sensor, a sonic sensor, a near infra-red sensor, and/or an ethanol sensor.

13. The beverage system according to claim 12, wherein the one or more parameters provided to the beverage system and/or the one or more parameters recorded from the beverage system may be remotely accessed via a wifi or cellular connection.

14. The beverage system according to claim 12, wherein the flow meter measures flow of water, carbonated water and/or nitrogenated water and provides an output signal to the controller, and the controller provides an output signal to the positive displacement pump in order to cause an alcohol concentration and/or a real extract concentration of the fermented beverage to be maintained approximately constant.

15. The beverage system according to claim 1, further comprising a controller configured to provide a secure access to the beverage system, wherein the controller provides secure access to a pump that is configured to draw the ultra-high gravity beverage through the first fluid line and wherein the controller is optionally held within a secure enclosure.

16. A beverage system that produces a fermented beverage from two or more liquid streams, the beverage system comprising:

a first source comprising ultra-high gravity beverage at a pressure of about 0 psig to about 150 psig (1034.2 kPa);

a second source comprising a carbonated and/or nitrogenated water at a pressure of about 12 psig (82.7 kPa) to about 150 psig (1034.2 kPa) and a temperature of about 0 to about 8° C.;

a first fluid line fluidly coupled to the first source and configured to allow the ultra-high gravity beverage to flow from the first source through the first fluid line;

a second fluid line fluidly coupled to the second source and configured to allow the carbonated and/or nitrogenated water to flow from the second source through the second fluid line;

a mixing point that fluidly couples the first fluid line to the second fluid line, the mixing point configured to allow the ultra-high gravity beverage to blend with the carbonated and/or nitrogenated water at the mixing point to produce the fermented beverage;

a third fluid line fluidly coupled to the mixing point and configured to allow the fermented beverage to flow to a dispensing tap;

a controller configured to provide one or more parameters to the beverage system in order to produce the fermented beverage; and a valve located between the mixing point and the dispensing tap, the valve configured to be actuated by an electronic signal provided to the valve from the controller.

17. The beverage system of claim 16, further comprising a digital screen, configured to receive a signal from the controller, and configured to display measured or derived parameters associated with the fermented beverage and/or the beverage system, wherein the measured or derived parameters are selected from the group consisting of carbon dioxide content, nitrogen content, temperature, calories, alcohol by volume, pour flow rate, remaining dispensable volume, and combinations thereof.

18. The beverage system of claim 17, wherein the controller provides the electronic signal when the carbon dioxide content, nitrogen content, alcohol by volume, temperature, and/or pour flow rate deviates by more than 5% from a target value for any one of said parameters.

19. The beverage system of claim 16, wherein the valve is located between the mixing point and the dispensing tap within twelve inches (30.48 cm) from the dispensing tap.

20. The beverage system of claim 16, wherein the dispensing tap can be opened and closed by a user.

* * * * *